(12) United States Patent
Ozog et al.

(10) Patent No.: US 11,875,615 B2
(45) Date of Patent: Jan. 16, 2024

(54) ODOMETRY NOISE MODEL FITTING FROM FLEET-SCALE DATASETS

(71) Applicant: TOYOTA RESEARCH INSTITUTE, INC., Los Altos, CA (US)

(72) Inventors: Paul Ozog, Ann Arbor, MI (US); Xipeng Wang, Ann Arbor, MI (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/733,937

(22) Filed: Apr. 29, 2022

(65) Prior Publication Data
US 2023/0351818 A1 Nov. 2, 2023

(51) Int. Cl.
*G07C 5/06* (2006.01)

(52) U.S. Cl.
CPC ..................... *G07C 5/06* (2013.01)

(58) Field of Classification Search
CPC .................................................. G07C 5/06
See application file for complete search history.

(56) References Cited

U.S. PATENT DOCUMENTS

| | | | |
|---|---|---|---|
| 7,031,031 B1 * | 4/2006 | Strasser | G01D 5/24461 356/498 |
| 10,041,808 B2 * | 8/2018 | Guillet | G01C 21/165 |
| 10,247,576 B2 * | 4/2019 | Heide | G01D 3/08 |
| 11,383,727 B2 * | 7/2022 | Niesen | B62D 15/025 |
| 2017/0089723 A1 * | 3/2017 | Heide | G01C 21/165 |
| 2019/0204430 A1 * | 7/2019 | Schmidt | G01S 3/803 |
| 2020/0011674 A1 | 1/2020 | Fanselow et al. | |

FOREIGN PATENT DOCUMENTS

| | | |
|---|---|---|
| CN | 113091770 A | 7/2021 |
| WO | 2021160098 A1 | 8/2021 |

OTHER PUBLICATIONS

Douanghachanh, et al., "A Study on the Use of Smartphones Under Realistic Settings to Estimate Road Roughness Condition," EURASIP Journal on Wireless Communications and Networking, vol. 2014, No. 114, pp. 1-11, 2014.

(Continued)

*Primary Examiner* — Tyler J Lee
(74) *Attorney, Agent, or Firm* — SEYFARTH SHAW LLP

(57) ABSTRACT

A method for fitting an odometry noise model of a vehicle is described. The method includes collecting multiple passes of sensor measurements from motion sensors of the vehicle to measure a motion sensor noise during a testing operation of the vehicle. The method also includes determining an estimated standard deviation of the motion sensor noise measured during the testing operation of the vehicle. The method further includes determining the odometry noise model of the vehicle according to the estimated standard deviation of the motion sensor noise measured during the testing operation of the vehicle. The method also includes compensating, using the odometry noise model, the motion sensor noise during normal operation of the vehicle.

17 Claims, 18 Drawing Sheets

(56) References Cited

OTHER PUBLICATIONS

Lee, et al., "Noise Estimation Based on Standard Deviation and Sigmoid Function Using a Posteriori Signal to Noise Ratio in Nonstatutory Noisy Environments," International Journal of Control, Automation, and Systems, vol. 6, No. 6, pp. 818-827, Dec. 2008.

Fazekas, et al., "Calibration and Improvement of an Odometry Model with Dynamic Wheel and Lateral Dynamics Integration," Sensors, vol. 21, No. 2, pp. 337-365, Jan. 6, 2021.

Nebot, et al., "Initial Calibration and Alignment of Low Cost Inertial Navigation Units for Land Vehicle Applications," Journal of Field Robotics, vol. 16, pp. 81-92, 1999.

Thong, et al., "Dependence of Inertial Measurements of Distance on Accelerometer Noise," Measurement Science and Technology, vol. 13, No. 8, Jul. 1, 2002.

Nunes, et al., "A Participatory Sensing Framework to Classify Road Surface Quality," Journal of Internet Services and Application, vol. 10, No. 1, pp. 1-16, Dec. 2019.

Alcantarilla, et al., "Noise Models in Feature-based Stereo Visual Odometry," found at https://arxiv.org/abs/1607.00273, submitted Jul. 1, 2016.

Izudin Cemer, "Embedded Noise Measurement," found at https://www.fierceelectronics.com/person/izudin-cemer.

Larsen, et al., "Location Estimation for an Autonomously Guided Vehicle Using an Augmented Kalman Filter to Autocalibrate the Odometry," Environment Science, 1998.

Basantis et al., "Standardized Performance Evaluation of Vehicles with Automated Capabilities," found at https://www.researchgate.net/Publication/335550159_Developing_a_Standardized_Performance_Evaluation_of_Vehicles_with_Automated_Driving_Features, Aug. 2019.

Kang, et al., "Modified Neural Network Aided EKF based SLAM for Improving an Accuracy of the Feature Map," The 2010 International Joint Conference on Neural Networks (IJCNN), pp. 1-7, 2010.

* cited by examiner

ODOMETRY NOISE MODEL FITTING FROM FLEET-SCALE DATASETS

BACKGROUND

Field

Certain aspects of the present disclosure generally relate to machine learning and, more particularly, odometry noise model fitting from fleet scale datasets.

Background

Autonomous agents (e.g., vehicles, robots, etc.) rely on machine vision for sensing a surrounding environment and analyzing areas of interest in images of the surrounding environment. Although scientists have spent decades studying the human visual system, a solution for realizing equivalent machine vision remains elusive. Realizing equivalent machine vision is a goal for enabling autonomous agents. Machine vision is distinct from the field of digital image processing. Instead, machine vision recovers a three-dimensional (3D) structure of the world from images and uses the 3D structure for fully understanding a scene based on a two-dimensional camera input. That is, machine vision strives to provide a high-level understanding of a surrounding environment, as performed by the human visual system.

In operation, autonomous agents, as well as advanced driver assistance systems (ADAS), may rely on high definition (HD) maps to provide surrounding vehicle information. An HD map may be generated based on vehicle odometry using motion sensors, such as light detection and ranging (LIDAR) sensors, sonar sensors, and other like motion sensors. In practice, however, these motion sensor are subject to noise, which may prevent the motion sensor measurements from meeting the precision specifications for generating, for example, HD maps. An odometry noise model for compensating for motion sensor noise during vehicle operation is desired.

SUMMARY

A method for fitting an odometry noise model of a vehicle is described. The method includes collecting multiple passes of sensor measurements from motion sensors of the vehicle to measure a motion sensor noise during a testing operation of the vehicle. The method also includes determining an estimated standard deviation of the motion sensor noise measured during the testing operation of the vehicle. The method further includes determining the odometry noise model of the vehicle according to the estimated standard deviation of the motion sensor noise measured during the testing operation of the vehicle. The method also includes compensating, using the odometry noise model, the motion sensor noise during normal operation of the vehicle.

A non-transitory computer-readable medium having program code recorded thereon for fitting an odometry noise model of a vehicle described. The program code is executed by a processor. The non-transitory computer-readable medium includes program code to collect multiple passes of sensor measurements from motion sensors of the vehicle to measure a motion sensor noise during a testing operation of the vehicle. The non-transitory computer-readable medium also includes program code to determine an estimated standard deviation of the motion sensor noise measured during the testing operation of the vehicle. The non-transitory computer-readable medium further includes program code to determine the odometry noise model of the vehicle according to the estimated standard deviation of the motion sensor noise measured during the testing operation of the vehicle. The non-transitory computer-readable medium also includes program code to compensate, using the odometry noise model, the motion sensor noise during normal operation of the vehicle.

A system for fitting an odometry noise model of a vehicle is described. The system includes a sensor noise measurement module to collect multiple passes of sensor measurements from motion sensors of the vehicle to measure a motion sensor noise during a testing operation of the vehicle. The system also includes a standard deviation module to determine an estimated standard deviation of the motion sensor noise measured during the testing operation of the vehicle. The system further includes a learned odometry noise model to determine the odometry noise model of the vehicle according to the estimated standard deviation of the motion sensor noise measured during the testing operation of the vehicle. The system also includes an odometry noise compensation module to compensate, using the odometry noise model, the motion sensor noise during normal operation of the vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
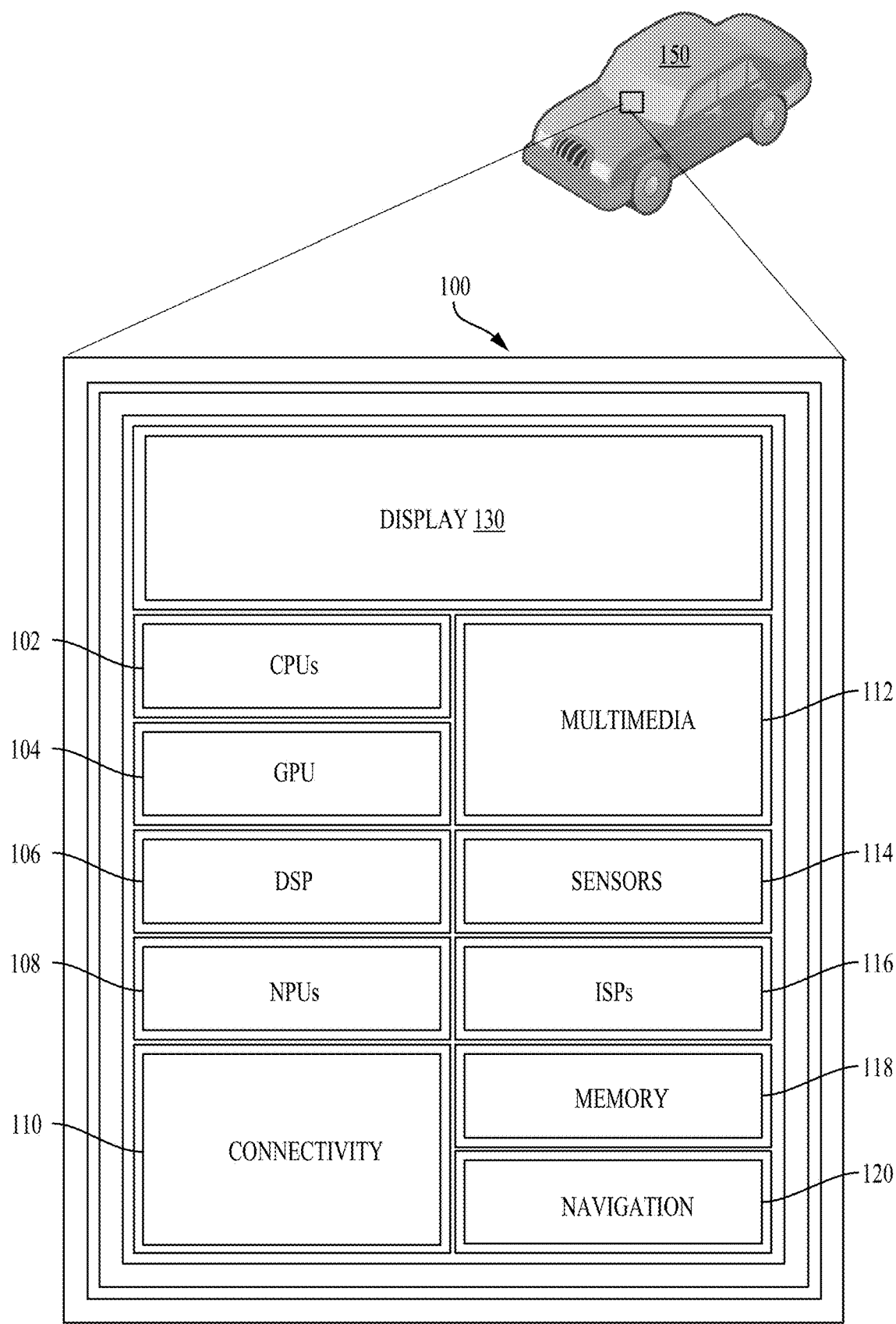
FIG. 1 illustrates an example implementation of designing a system using a system-on-a-chip (SOC) for learning a vehicle specific odometry noise model, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents may rely on motion sensors to identify objects surrounding an autonomous agent. For example, the more sensors may include light detection and ranging (LIDAR) sensors, sonar sensors, depth sensors, and other like motion sensors. In operation, autonomous vehicles, as well as advanced driver assistance systems (ADAS), may rely on an annotated high definition (HD) map for providing surrounding vehicle information and enabling vehicle navigation. An HD map may be generated based on vehicle odometry using motion sensors, such as an accelerometer, or other like motion sensor.

Odometry involves using motion sensors (e.g., accelerometers) to determine a change in position of autonomous vehicles relative to some known position. A high level of precision when making these measurements is specified for generating HD maps. Moreover, vehicles with specialized sensors are deployed to collect information regarding roads that are subsequently utilized to generate HD maps. In practice, however, these motion sensors are subject to noise, which may prevent the motion sensor measurements from meeting the precision specifications for generating, for example, HD maps.

Current solutions to compensate for motion sensor noise utilize a simple odometry noise model. This simple odometry noise model provides a one-size-fits-all solution and is not specific to the particular sensors utilized in different vehicles. For example, this simple odometry noise model is essentially the best guess of the standard deviation of a motion sensor signal in the X and Y direction over a distance traveled. An odometry noise model for compensating for motion sensor noise during specific vehicle operation is desired.

Some aspects of the present disclosure provide an improvement over the prior art simple odometry noise model by utilizing a methodology for determining the odometry noise of the motion sensors of a specific vehicle. That is, instead of utilizing a one-size-fits-all odometry noise model, this aspect of the present disclosure allows for developing a customized odometry noise model based on actual noise emitted by the motion sensors of a specific vehicle. These aspects of the present disclosure provide a customized odometry noise model for a specific vehicle that provides a standard deviation of the motion sensor signals in the X and Y direction over a distance traveled. Broadly, some aspects of the present disclosure are directed to a method for determining an odometry noise model for a specific vehicle.

FIG. 1 illustrates an example implementation of the aforementioned system and method for learning a vehicle specific odometry noise model using a system-on-a-chip (SOC) 100 of an ego vehicle 150. The SOC 100 may include a single processor or multi-core processors (e.g., a central processing unit (CPU)), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The system-on-a-chip (SOC) 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130, illustrating a view of a vehicle. In some aspects, the NPU 108 may be implemented in the CPU 102, DSP 106, and/or GPU 104. The SOC 100 may further include a sensors 114, image signal processors (ISPs) 116, and/or navigation 120, which may, for instance, include a global positioning system (GPS).

The system-on-a-chip (SOC) 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for learning a vehicle specific odometry noise model for the sensors 114. The instructions loaded into a processor (e.g., NPU 108) may also include code for planning and control (e.g., of the ego vehicle 150) in response to learning the vehicle specific odometry noise model for the sensors 114.

The instructions loaded into a processor (e.g., NPU 108) may also include code to collect multiple passes of sensor measurements from motion sensors of the vehicle to measure a motion sensor noise during a testing operation of the vehicle. The instructions loaded into the NPU 108 may also include code to determine a standard deviation of the motion sensor noise measured during the testing operation of the vehicle. The instructions loaded into the NPU 108 may further include code to determine the odometry noise model of the vehicle according to the determined standard deviation of the motion sensor noise measured during the testing operation of the vehicle. The instructions loaded into the NPU 108 may also include code to compensate motion sensor noise during normal operation of the vehicle using the odometry noise model.

Figure 2:
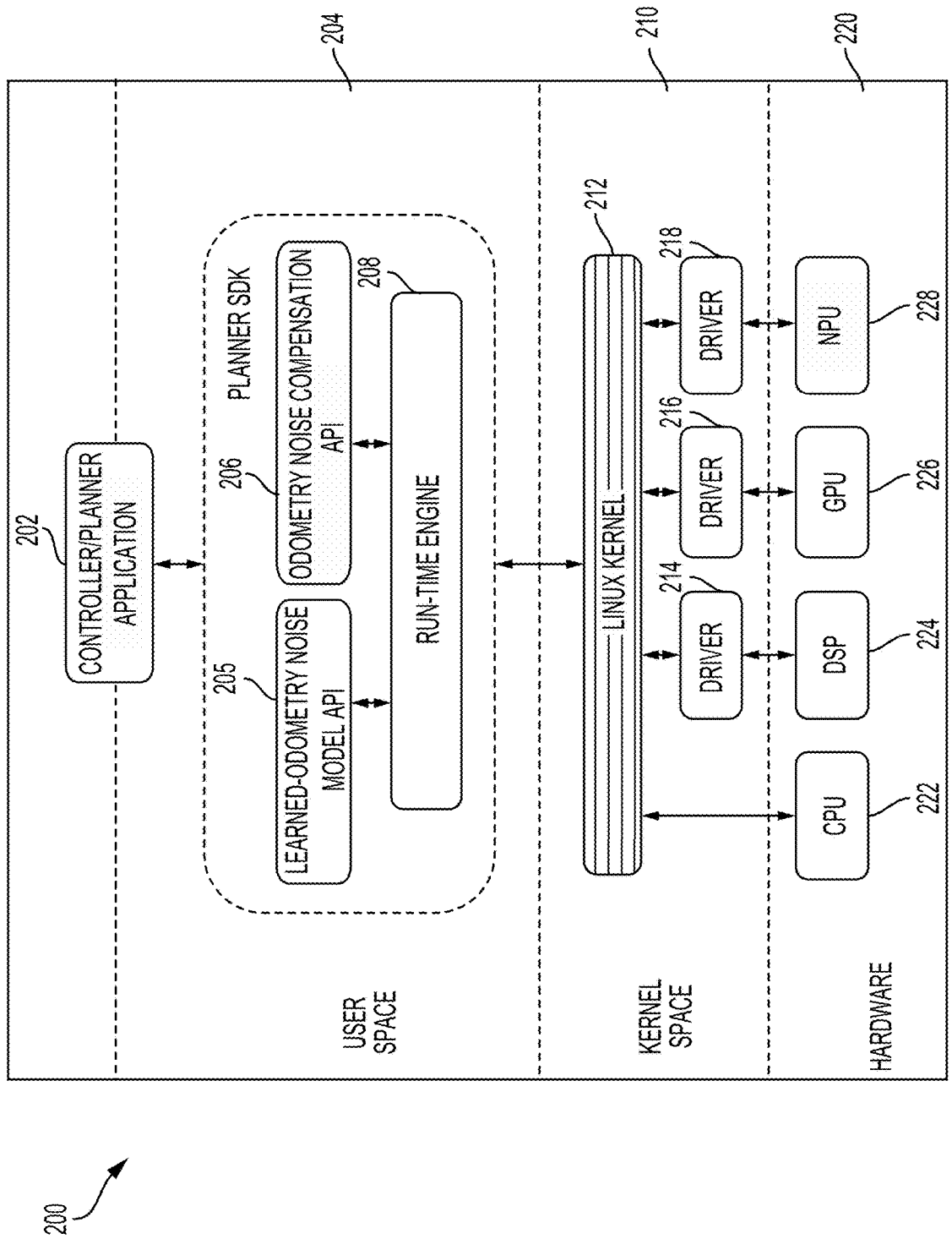
FIG. 2 is a block diagram illustrating a software architecture that may modularize functions for learning an odometry noise model, according to aspects of the present disclosure.

FIG. 2 is a block diagram illustrating a software architecture 200 that may modularize functions for planning and control of an ego vehicle using a learned vehicle specific odometry noise model, according to aspects of the present disclosure. Using the architecture, a controller/planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller/planner application 202.

The controller/planner application 202 may be configured to call functions defined in a user space 204 that may, for example, analyze a vehicle odometry signal generated by motion sensors of an ego vehicle. In aspects of the present disclosure, a vehicle specific odometry noise model is learned to compensate for sensor noise, which degrades a vehicle odometry signal for HD map formation. The controller/planner application 202 may make a request to compile program code associated with a library defined in a learned-odometry noise model application programming interface (API) 205. The controller/planner application 202 may make a further request to compile program code associated with the library defined in an odometry noise compensation API 206 to compensate for sensor noise in a vehicle odometry signal generated during operation of an ego vehicle.

A run-time engine 208, which may be compiled code of a run-time framework, may be further accessible to the controller/planner application 202. The controller/planner application 202 may cause the run-time engine 208, for example, to learn a vehicle specific odometry noise model to compensate for noise in a vehicle odometry noise signal. When an object is detected within a predetermined distance of the ego vehicle, the run-time engine 208 may in turn send a signal to an operating system 210, such as a Linux Kernel 212, running on the system-on-a-chip (SOC) 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network (DNN) may be configured to run on a combination of processing blocks, such as the CPU 222 and the GPU 226, or may be run on the NPU 228, if present.

Figure 3:
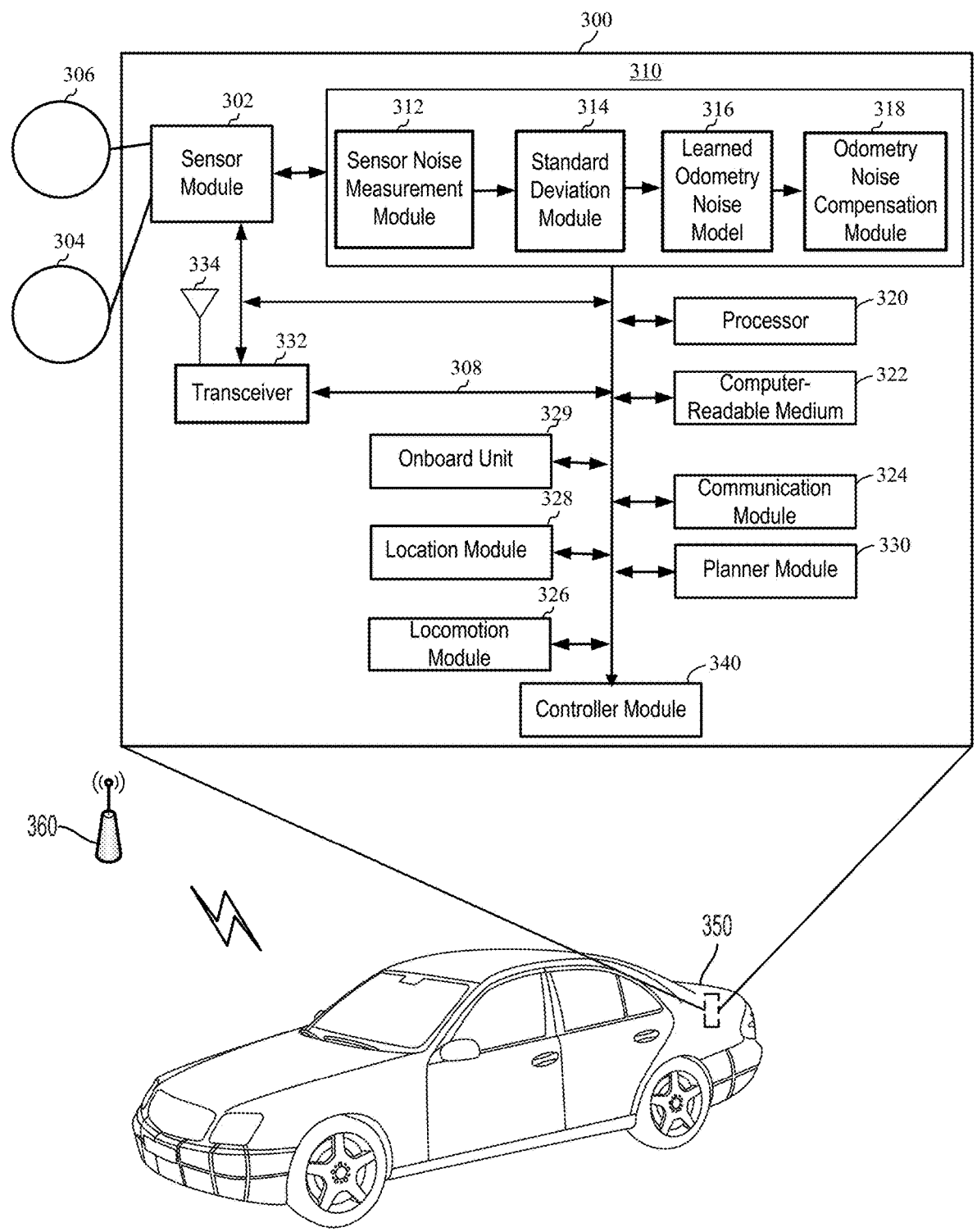
FIG. 3 is a diagram illustrating an example of a hardware implementation for a vehicle specific odometry noise model system, according to aspects of the present disclosure.

FIG. 3 is a diagram illustrating an example of a hardware implementation for a vehicle specific odometry noise model system, according to aspects of the present disclosure. A vehicle specific odometry noise model system 300 may be configured for compensating a vehicle odometry signal generated by motion sensors of a car 350. In aspects of the present disclosure, a vehicle specific odometry noise model is learned to compensate for sensor noise, which degrades a vehicle odometry signal that is used, for example, in HD map formation. The vehicle specific odometry noise model system 300 may learn an odometry noise model based on estimation of a standard deviation of a sensor noise. The estimate of the standard deviation can be a mean orientation of the car 350 as a function of a distance traveled on a path normalized by a square root of a distance traveled. The vehicle specific odometry noise model system 300 may compensate for sensor noise in a vehicle odometry signal generated during operation of the car 350.

The vehicle specific odometry noise model system 300 may be a component of a vehicle, a robotic device, or other device. For example, as shown in FIG. 3, the vehicle specific odometry noise model system 300 is a component of the car 350. Aspects of the present disclosure are not limited to the vehicle specific odometry noise model system 300 being a component of the car 350, as other devices, such as a bus, motorcycle, or other like vehicle, are also contemplated for using the vehicle specific odometry noise model system 300. The car 350 may be autonomous or semi-autonomous.

The vehicle specific odometry noise model system 300 may be implemented with an interconnected architecture, represented generally by an interconnect 308. The interconnect 308 may include any number of point-to-point interconnects, buses, and/or bridges depending on the specific application of the vehicle specific odometry noise model system 300 and the overall design constraints of the car 350. The interconnect 308 links together various circuits, including one or more processors and/or hardware modules, represented by a sensor module 302, a vehicle odometry module 310, a processor 320, a computer-readable medium 322, a communication module 324, a locomotion module 326, a location module 328, an onboard unit 329, a planner module 330, and a controller module 340. The interconnect 308 may also link various other circuits, such as timing sources, peripherals, voltage regulators, and power management circuits, which are well known in the art, and therefore, will not be described any further.

The vehicle specific odometry noise model system 300 includes a transceiver 332 coupled to the sensor module 302, the vehicle odometry module 310, the processor 320, the computer-readable medium 322, the communication module 324, the locomotion module 326, the location module 328, the onboard unit 329, the planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit a learned odometry noise model from the vehicle odometry module 310 to a server (not shown).

The vehicle specific odometry noise model system 300 includes the processor 320 coupled to the computer-readable medium 322. The processor 320 performs processing, including the execution of software stored on the computer-readable medium 322 to provide the vehicle specific odometry noise model functionality, according to the present disclosure. The software, when executed by the processor 320, causes the vehicle specific odometry noise model system 300 to perform the various functions described for compensation of odometry noise during operation of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing two-dimensional (2D) RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306, such as an accelerometer to supply a vehicle odometry signal.

The motion sensor measurements of the first sensor 304 and/or the second sensor 306 may be processed by the processor 320, the sensor module 302, the vehicle odometry module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, motion sensor information determined from the first sensor 304 and/or the second sensor 306 may be transmitted via the transceiver 332. The first sensor 304 and the second sensor 306 may be coupled to the car 350 or may be in communication with the car 350 to provide a vehicle odometry signal.

Odometry involves using motion sensors (e.g., accelerometers) to determine a change in position of autonomous vehicles relative to some known position. A high level of precision when making these measurements is specified for generating HD maps. Moreover, vehicles with specialized sensors are deployed to collect information regarding roads that are subsequently utilized to generate HD maps. In practice, however, these motion sensors are subject to noise, which may prevent the motion sensor measurements from meeting the precision specifications for generating, for example, HD maps.

Current solutions to compensate for motion sensor noise utilize a simple odometry noise model. This simple odometry noise model provides a one-size-fits-all solution and is not specific to the particular sensors utilized in different vehicles. For example, this simple odometry noise model is essentially the best guess of the standard deviation of a motion sensor signal in the X and Y direction over a distance traveled. An odometry noise model for compensating for motion sensor noise during specific vehicle operation is desired.

Some aspects of the present disclosure provide an improvement over a simple odometry noise model by utilizing a methodology for determining the odometry noise of the motion sensors (e.g., the first sensor 304 and/or the second sensor 306) of the car 350. That is, instead of utilizing a one-size-fits-all odometry noise model, this aspect of the present disclosure allows for developing a customized odometry noise model based on actual noise emitted by the motion sensors (e.g., the first sensor 304 and/or the second sensor 306) of the car 350. These aspects of the present disclosure provide a customized odometry noise model for the car 350 that provides a standard deviation of the motion sensor signals in the X and Y direction over a distance traveled.

Connected vehicle applications support vehicle-to-vehicle (V2V) communications and vehicle-to-infrastructure (V2I) communications with wireless technology. For example V2V communications use wireless signals to send information back and forth between other connected vehicles (e.g., location, speed, and/or direction). Conversely, V2I communications involve V2I (e.g., road signs or traffic signals) communications, generally involving vehicle safety issues. For example, V2I communications may request traffic information from a traffic management system to determine best possible routes. V2V and V2I applications for connected vehicles dramatically increase automotive safety by transforming vehicle operation.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short- Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A dedicated short-range communication (DSRC)-compliant global positioning system (GPS) unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), third generation (3G), etc. The communication module 324 may also communicate with other components of the car 350 that are not modules of the vehicle specific odometry noise model system 300. The transceiver 332 may be a communications channel through a network access point 360. The communications channel may include dedicated short-range communication (DSRC), LTE, LTE-device-to-device (D2D) (LTE-D2D), mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, dedicated short-range communication (DSRC), full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X) (LTE-V2X), LTE-device-to-device (D2D) (LTE-D2D), voice over long term evolution (VoLTE), or any other mobile data network or combination of mobile data networks. Further, the network access point 360 may include one or more Institute of Electrical and Electronics Engineers (IEEE) 802.11 wireless networks.

The vehicle specific odometry noise model system 300 also includes the planner module 330 for planning a selected trajectory to perform a route/action (e.g., collision avoidance) of the car 350, and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and highly autonomous vehicle.

The vehicle odometry module 310 may be in communication with the sensor module 302, the processor 320, the computer-readable medium 322, the communication module 324, the locomotion module 326, the location module 328, the onboard unit 329, the planner module 330, the transceiver 332, and the controller module 340. In one configuration, the vehicle odometry module 310 receives sensor data from the sensor module 302. The sensor module 302 may receive the sensor data from the first sensor 304 and the second sensor 306. According to aspects of the present disclosure, the vehicle odometry module 310 may receive sensor data directly from the first sensor 304 and/or the second sensor 306. In this aspect of the present disclosure, the vehicle odometry module 310 learns an odometry noise model based on a sensor noise measurement from the first sensor 304 and/or the second sensor 306 of the car 350.

As shown in FIG. 3, the vehicle odometry module 310 includes a sensor noise measurement module 312, a standard deviation module 314, a learned odometry noise model 316, and an odometry noise compensation module 318 (e.g., based on the learned odometry noise model 316). The learned odometry noise model 316 and the odometry noise compensation module 318 may be components of a same or different artificial neural network, such as a deep neural network (DNN). The learned odometry noise model 316 and the odometry noise compensation module 318 are not limited to a DNN. In operation, the vehicle odometry module 310 receives sensor data from the first sensor 304 and/or the second sensor 306. The sensor data may be motion sensor data when the first sensor 304 and/or the second sensor 306 are implemented using an accelerometer. The motion sensor data may be a vehicle odometry signal that is degraded by motion sensor noise from an acceleration motion sensor.

The vehicle odometry module 310 is configured to compensate for a vehicle odometry signal generated by motion sensors, such as the first sensor 304 and the second sensor 306 of the car 350. In some aspects of the present disclosure, the sensor noise measurement module 312 is configured to collect multiple passes of sensor measurements from motion sensors, such as the first sensor 304 and/or the second sensor 306 of the car 350. In this aspect of the present disclosure, the sensor noise measurement module 312 is configured to measure a motion sensor noise during a testing operation of the car 350. In response, the standard deviation module 314 is configured to determine a standard deviation of the motion sensor noise measured during the testing operation of the car 350. Next, the learned odometry noise model 316 is configured to determine an odometry noise model of the vehicle, according to the determined standard deviation of the motion sensor noise measured during the testing operation of the car 350. Once the odometry model is determined, the odometry noise compensation module 318 is configured to compensate for motion sensor noise during normal operation of the car 350 using the learned odometry noise model 316, as further illustrated in FIGS. 4-9B.

Figure 4A:
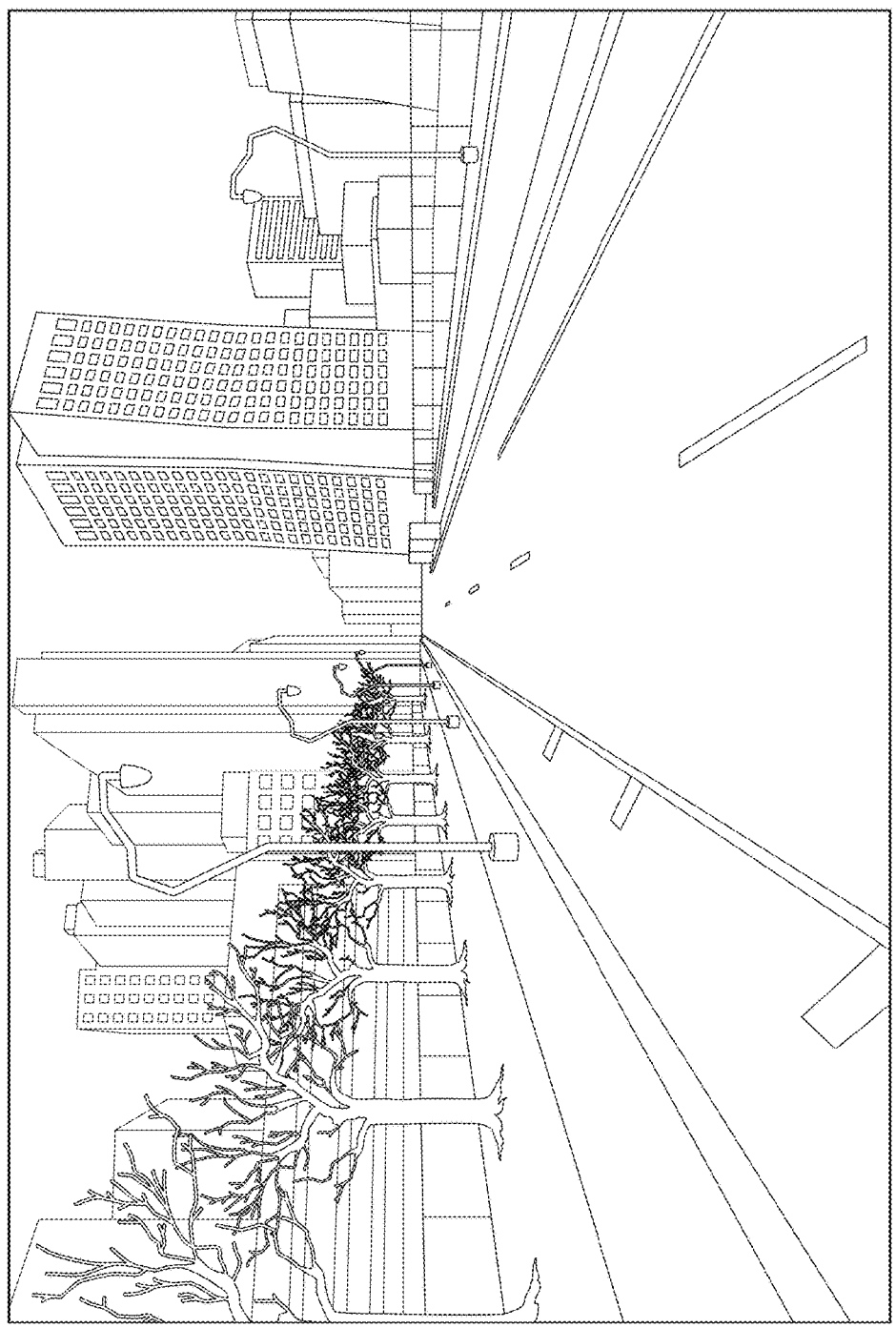
FIG. 4A illustrates an example of a straight road utilized to collect multiple passes of measurements from the motion sensors as a first step of a vehicle specific odometry noise model learning process, according to aspects of the present disclosure.

FIG. 4A illustrates an example of a straight road 400 utilized to collect multiple passes of measurements from the motion sensors as a first step of a vehicle specific odometry noise model learning process, according to aspects of the present disclosure. The first step of the vehicle specific odometry noise model learning process involves multiple passes of sensor measurements that are collected from the motion sensors while driving down the straight road 400 several times. Preferably, the sensor measurements are performed while driving down the straight road 400. Alternatively, it is possible to perform multiple passes on different roads that are all substantially straight using a fleet of vehicles. In the example of FIG. 4A, the straight road 400 is utilized to collect multiple passes of measurements from the motion sensors of a vehicle.

Figure 4B:
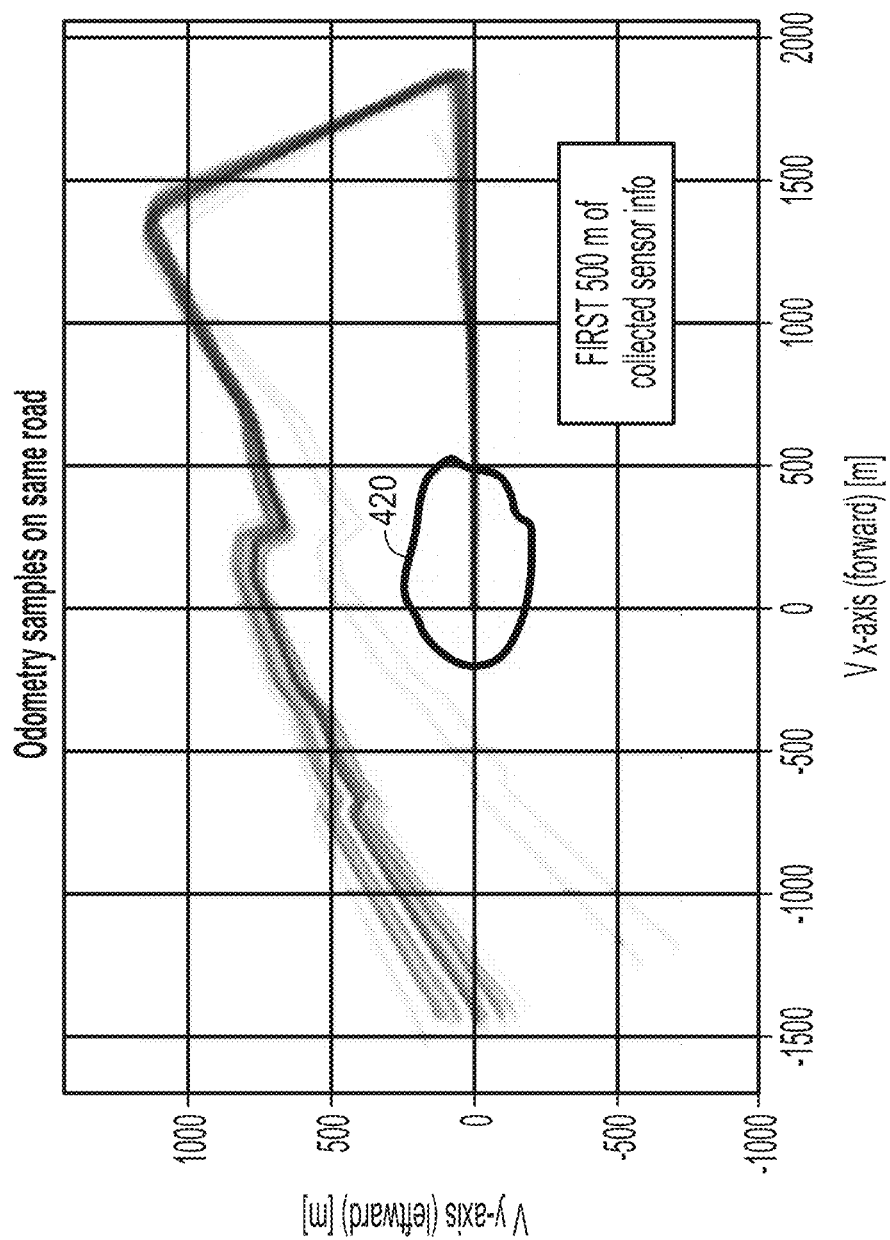
FIGS. 4B and 4C are graph illustrating multiple passes of collected sensor information while driving on the straight road of FIG. 4 of the vehicle specific odometry noise model learning process, according to aspects of the present disclosure.
Figure 4C:
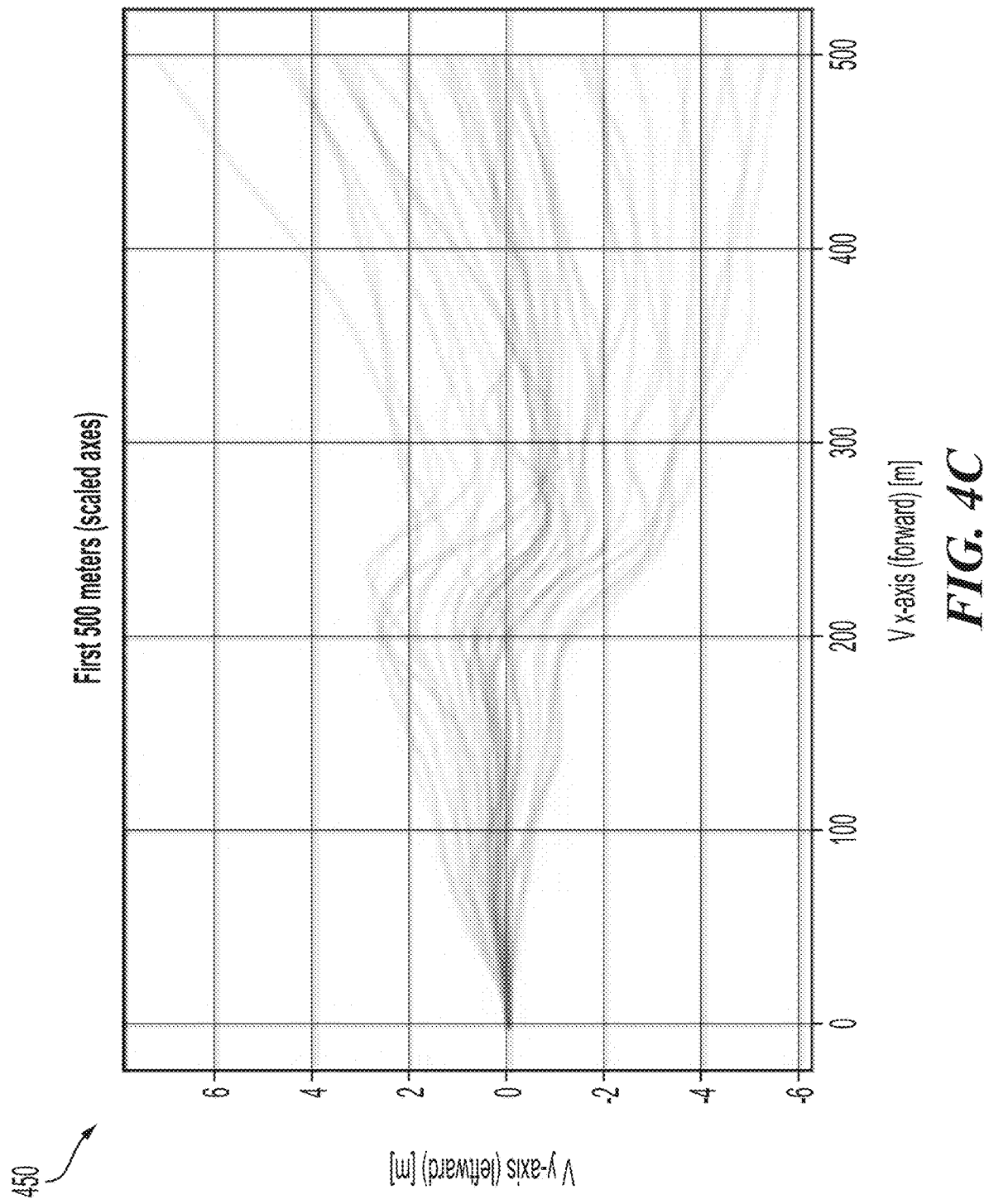

FIGS. 4B and 4C are graphs illustrating multiple passes of collected sensor information while driving on the straight road 400 of FIG. 4A of the vehicle specific odometry noise model learning process, according to aspects of the present disclosure. In this second step, the vehicle specific odometry noise model learning process visualizes the odometry signals collected from multiple passes of driving down the straight road 400, assuming that each trajectory starts at the same location. In FIG. 4B, multiple passes of collected sensor information are shown with each pass having a different shading, in which an x-axis represents a forward direction and a y-axis represents a leftward direction of a graph 410. In this example, the first 500 meters of the collected sensor information are highlighted within a circled area 420, which were collected along a straight road, similar to the straight road 400 shown in FIG. 4A.

FIG. 4C illustrates a trajectory graph 450 illustrating the trajectories 460 of an exploded view of the circled area 420 of the graph 410 in FIG. 4B, illustrating multiple passes of the collected sensor information while driving a vehicle on the straight road 400 of FIG. 4, according to aspects of the present disclosure. In this example, FIG. 4C illustrates a more detailed view of the first 500 meters of the collected sensor information shown in the circled area 420 of the graph 410 of FIG. 4B. As further illustrated in FIG. 4C, there is significant variation shown by the trajectories 460 output by the motion sensors of the vehicle during the first 500 meters in this step of the vehicle specific odometry noise model learning process.

Figure 5A:
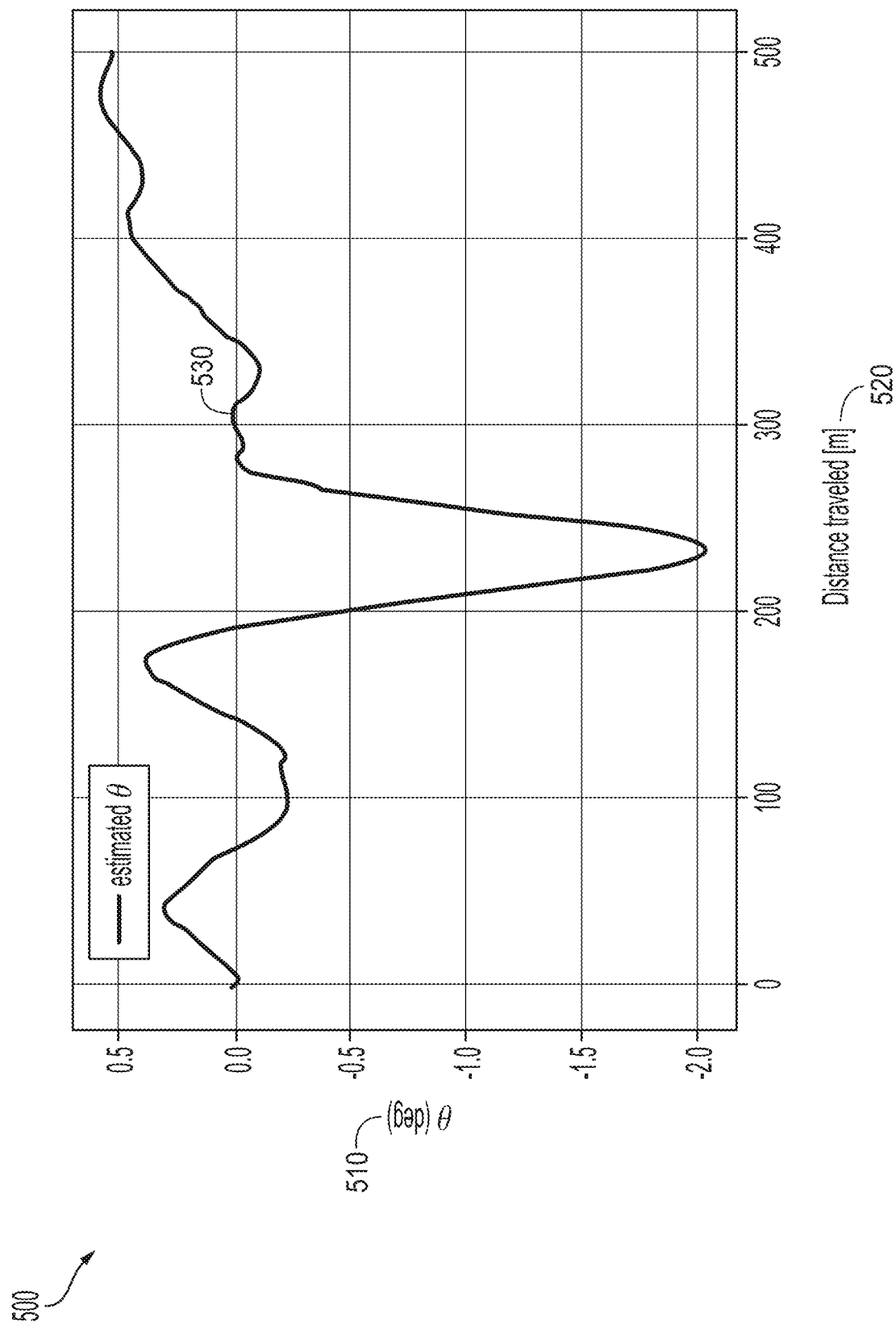
FIG. 5A is a mean orientation graph illustrating the orientations in a y-axis relative to a distance traveled by the vehicle in an x-axis, according to aspects of the present disclosure.

FIG. 5A illustrates a mean orientation graph 500 illustrating the orientations 510 in a y-axis relative to a distance traveled 520 by the vehicle in an x-axis, according to aspects of the present disclosure. This next step of the vehicle specific odometry noise model learning process applies per distance orientations ($\theta$) 510 to compute a mean orientation 530 as a function of the distance traveled 520 by the vehicle. In some aspects of the present disclosure, the orientations 510 can be estimated by simple averaging in this step of the vehicle specific odometry noise model learning process.

Figure 5B:
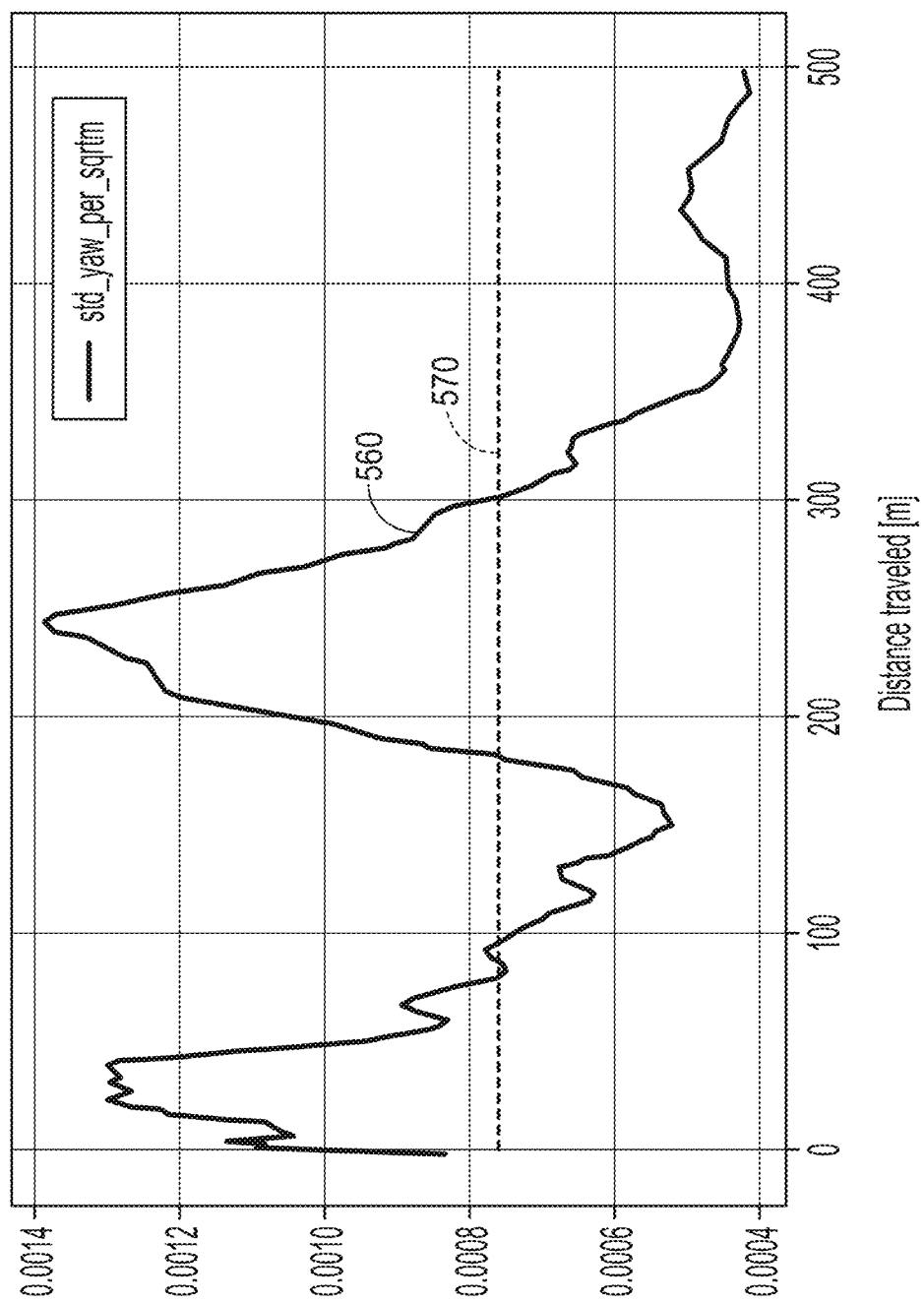
FIG. 5B is a graph illustrating normalization of the mean orientation graph of FIG. 5A, according to aspects of the present disclosure.

FIG. 5B is a graph 550 illustrating normalization of the mean orientation graph of FIG. 5A, according to aspects of the present disclosure. In this next step of the vehicle specific odometry noise model learning process, normalizing of the mean orientation graph 500 of FIG. 5A is performed according to a square root of a distance traveled. Normalizing the mean orientation graph 500 of FIG. 5A according to a square root of a distance traveled provides an estimated standard deviation signal 560 of a vehicle yaw per a square root of the distance traveled. The graph 550 also illustrates a mean 570 of the estimated standard deviation signal 560 of the vehicle yaw per the square root of the distance traveled.

Figure 6A:
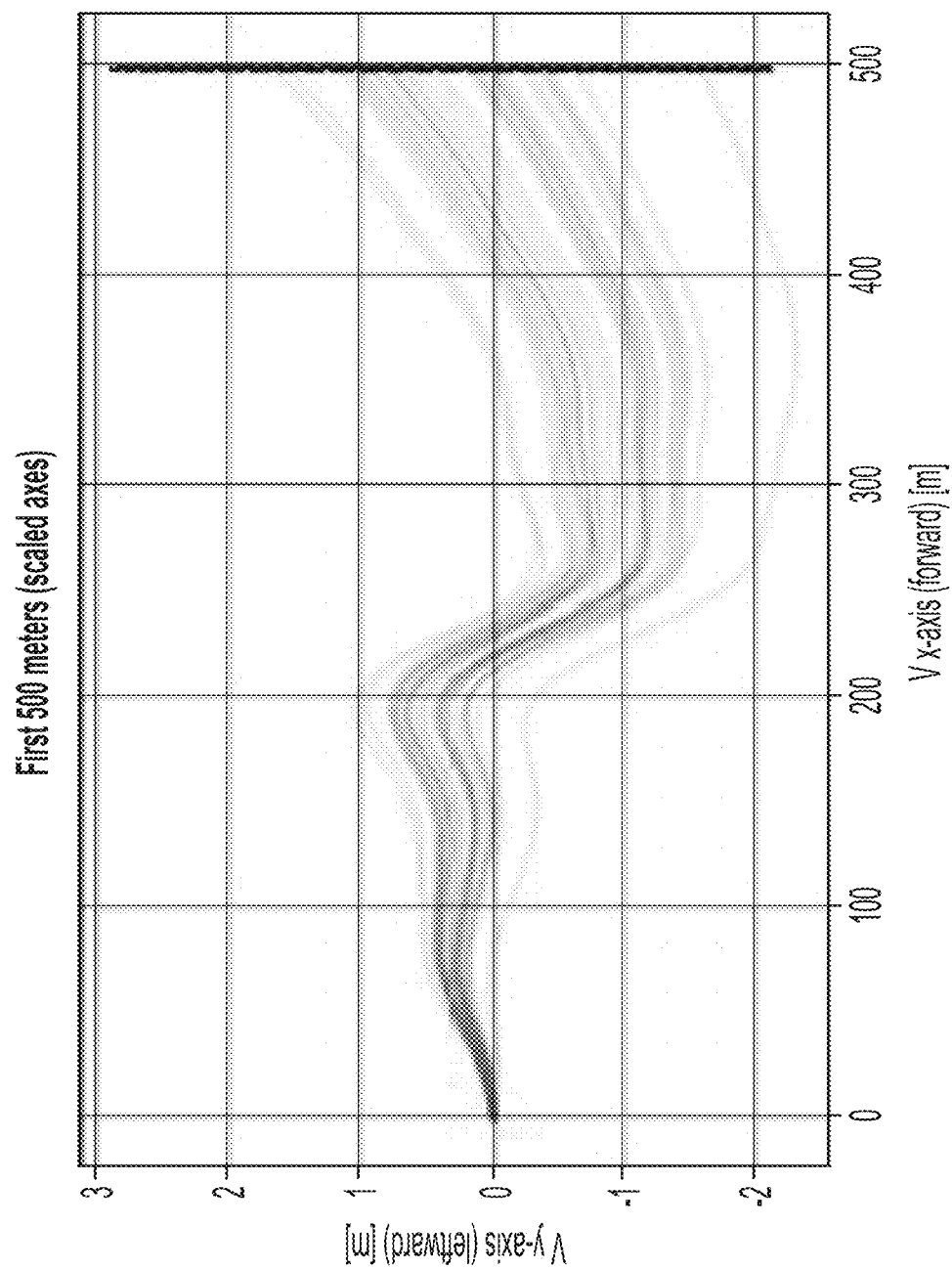
FIGS. 6A and 6B are graphs illustrating the final steps of the vehicle specific odometry noise model learning process, according to aspects of the present disclosure.
Figure 6B:
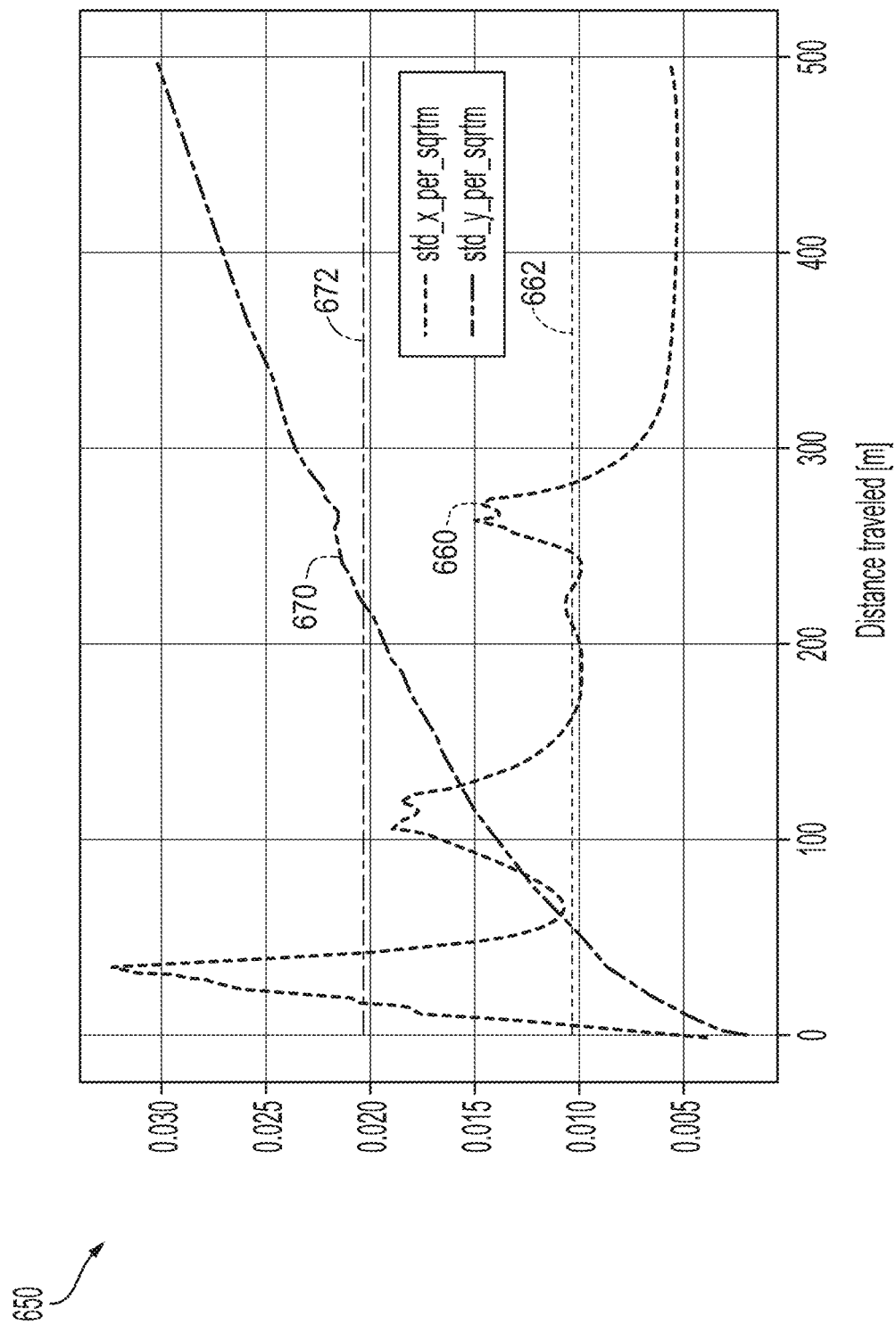

FIGS. 6A and 6B are graphs illustrating the final steps of the vehicle specific odometry noise model learning process, according to aspects of the present disclosure. FIG. 6A illustrates a trajectory graph 600, in which the vehicle specific odometry noise model learning process continues by conditioning on the estimated standard deviation signal 560 of FIG. 6B. In some aspects of the present disclosure, conditioning on the estimated standard deviation signal 560 of FIG. 5B is used to re-derive the trajectories 460 shown in the trajectory graph 450 of FIG. 4C to generate trajectories 610 for all the trajectory samples shown in FIG. 4C.

As shown in FIG. 6B, the final step of the vehicle specific odometry noise model learning process uses the trajectories 610 re-derived for all the trajectories 460 shown in the trajectory graph 450 of FIG. 4C. Based on the trajectories 610, the vehicle specific odometry noise model learning process plots an estimate of a standard deviation of the sensor noise in an X-direction (e.g., an estimated X-direction standard deviation signal 660) and a Y-direction (e.g., an estimated Y-direction standard deviation signal 670) over distance, as shown in a standard deviation graph 650 of FIG. 8B. The standard deviation graph 650 also illustrates an X-direction average 662 of the estimated X-direction standard deviation signal 660, and a Y-direction average 672 of the estimated Y-direction standard deviation signal 670. In some aspects of the present disclosure, the vehicle specific odometry noise model learning process learns the odometry noise model of a vehicle based on the estimated X-direction standard deviation signal 660 and the estimated Y-direction standard deviation signal 670 of the motion sensor noise of the vehicle, by compensating according to the X-direction average 662 and the Y-direction average 672.

In driving we have a simple odometry noise model that says that the standard deviation of positional and orientation components of the sequential relative transform scale with the square root of the distance traveled, and are independent. The noise model is therefore defined by a positional parameter and an orientation parameter: std_xyz_per_sqrtm and std_rph_per_sqrtm. Unfortunately, noise associated with this model is generally insufficient for generating electronic high definition (HD) maps. Some aspect of the present disclosure perform simulations using this model to determine a distribution of vehicle trajectories for different values of these positional and orientation parameters if the same straight path of length 500 meters is driven 100 times.

Figure 7A:
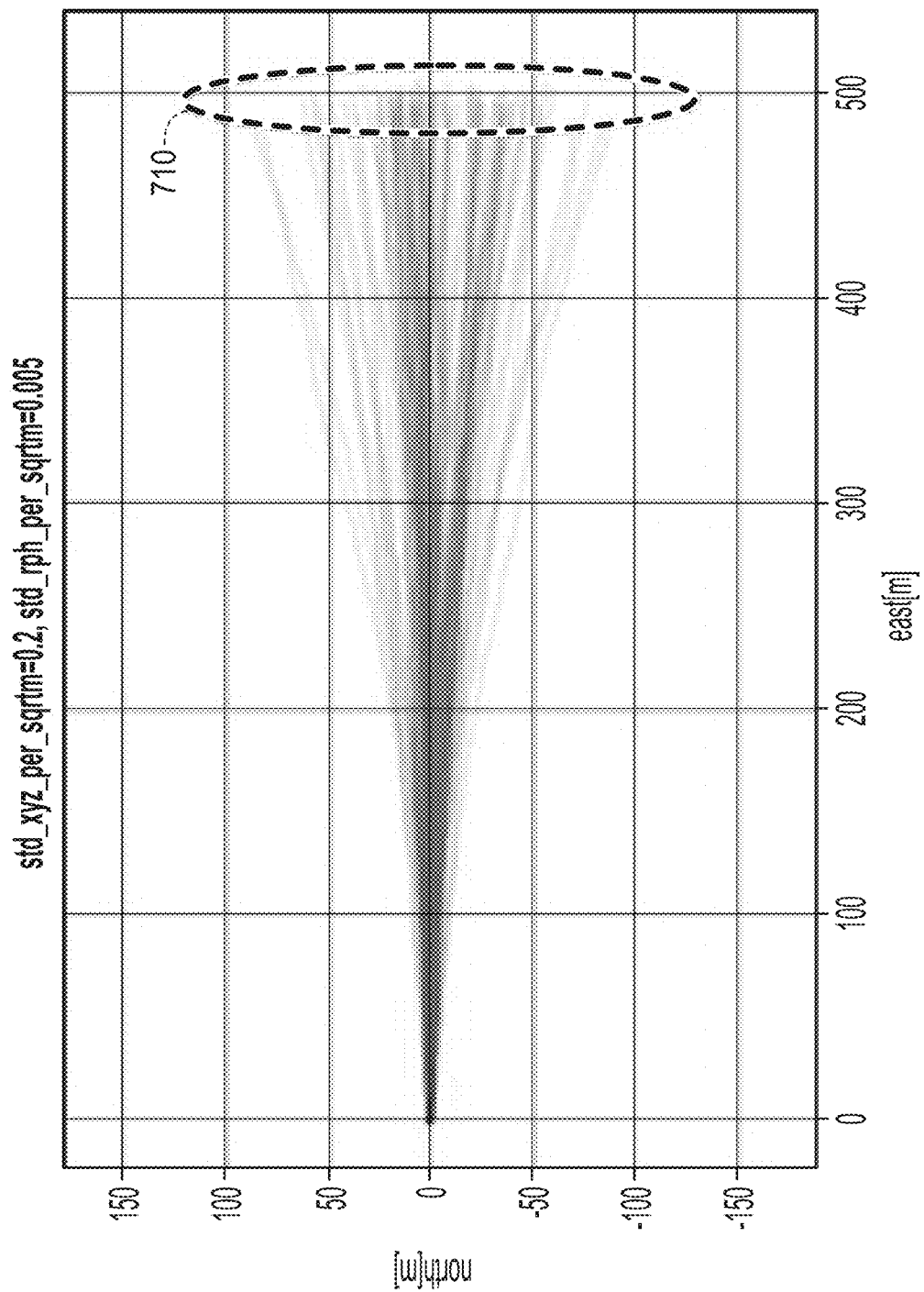
FIG. 7A is a graph illustrating a simulation of a vehicle that is driven the same straight path of length 500 meters is driven 100 times using predetermined positional and orientation parameters, according to aspects of the present disclosure.

FIG. 7A is a graph 700 illustrating a simulation of a vehicle that is driven the same straight path of length 500 meters is driven 100 times using predetermined positional and orientation parameters, according to aspects of the present disclosure. Similar to the trajectory graph 450 of FIG. 4C, the graph 700 trajectories 710, having significant variation in the simulated output of the motion sensors of the vehicle during the 500 meters of the simulation as a first step of a vehicle specific odometry noise model fitting process. In this example, however, trajectories 710 are simulated based on the predetermined positional and orientation parameters (e.g., std_xyz_per_sqrtm=0.2 and std_rph_per_sqrtm=0.005).

Some aspects of the present disclosure estimate the positional and orientation parameters (e.g., std_xyz_per_sqrtm and std_rph_per_sqrtm) as noise values from samples of the trajectories, such as the trajectories 710 shown in FIG. 7A. Aspects of the present disclosure recognize that estimating the positional and orientation parameters is simplified by separately considering the positional and orientation parameters. In these aspects of the present disclosure, a composition of transforms is defined according to Equation (1)

$$\prod_i^N T_{i,j+1} = \prod_i^N R_{i,i+1} + t_{i,N}^l \qquad (1)$$

where $t_{1,N}^1$ is a final position of a robot resolved in the first frame, $R_{\{i,i+1\}}$ is the rotation from THE vehicle frame at time i+1 to the vehicle frame at time i. and $T_{\{i,i+1\}}$ is the transformation from the vehicle frame at time i+1 to the vehicle frame at time i, including both rotation and translation.

Figure 7B:
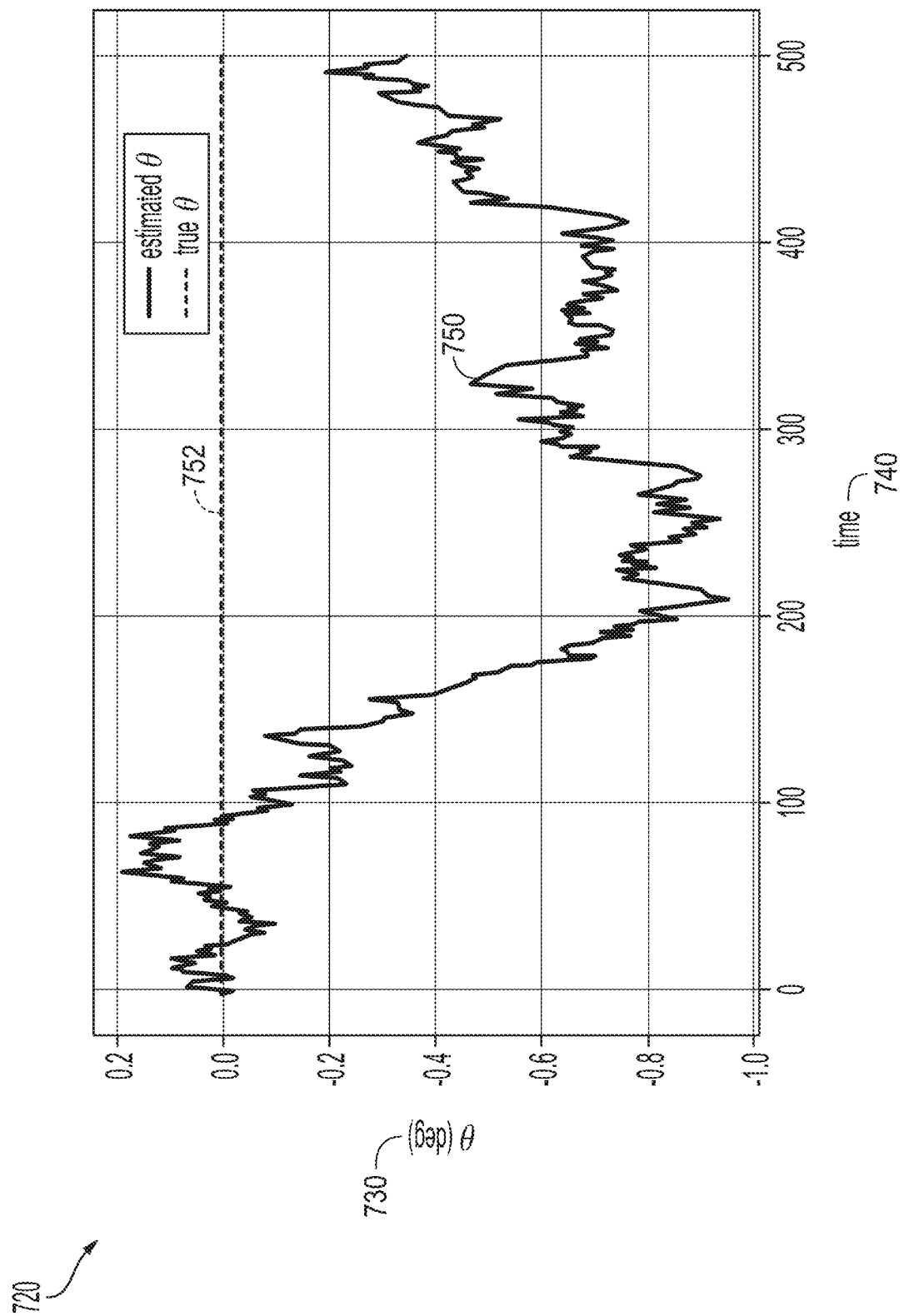
FIG. 7B illustrates an estimated orientation graph illustrating orientations in a y-axis relative to a distance traveled by the vehicle in an x-axis, according to aspects of the present disclosure.

FIG. 7B illustrates an estimated orientation graph 720 illustrating orientations 730 in a y-axis relative to a distance traveled 740 by the vehicle in an x-axis, according to aspects of the present disclosure. This next step of the vehicle specific odometry noise model fitting process applies per distance orientations (θ) 730 to compute an estimated orientation 750 as a function of the distance traveled 740. In some aspects of the present disclosure, the estimated orientation 750 can be estimated by simple averaging for each pose in this step of the vehicle specific odometry noise model fitting process. This example also illustrates a true orientation 752 based on the simulations.

Figure 7C:
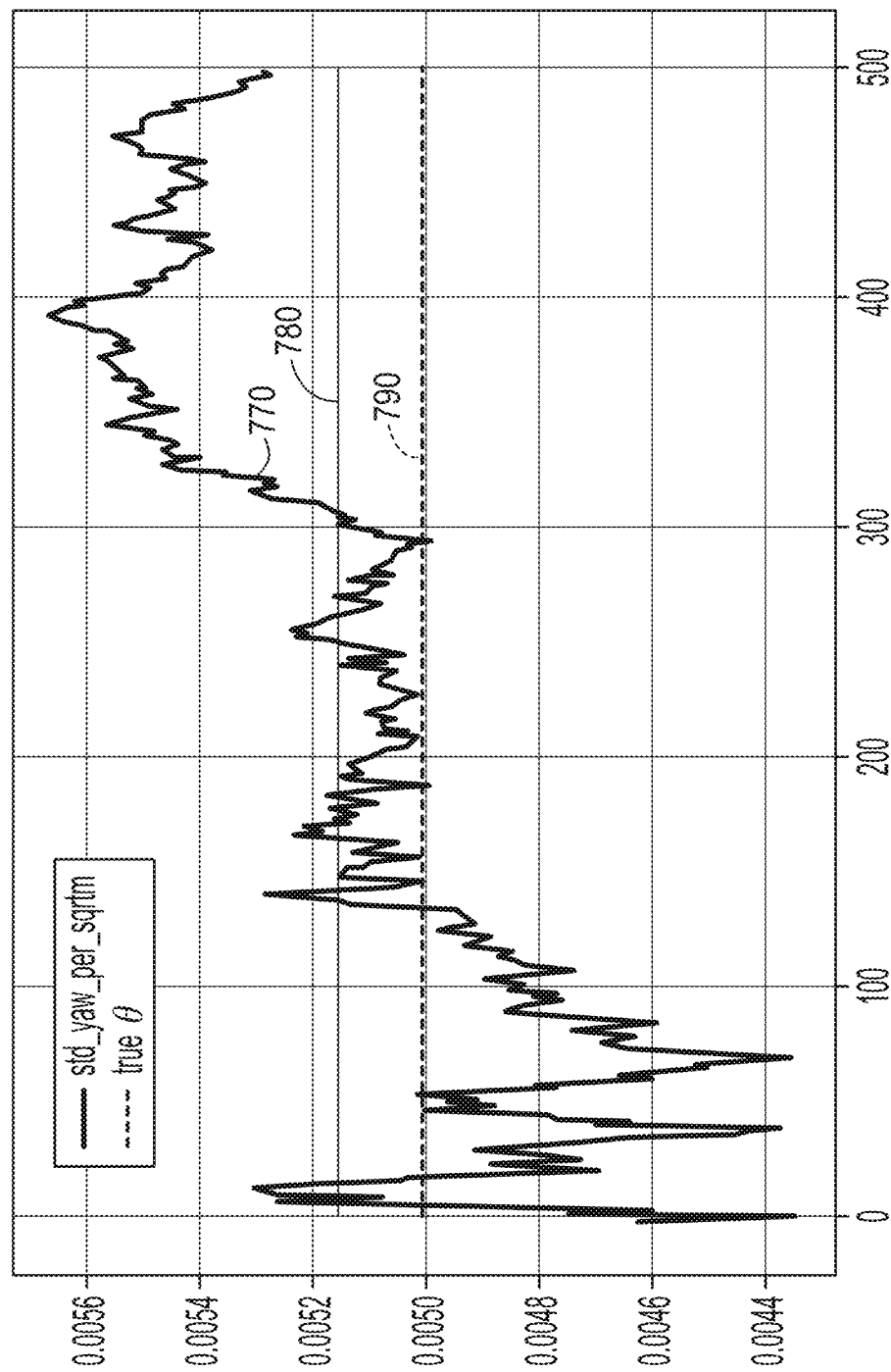
FIG. 7C is a graph illustrating normalization of the estimated orientation graph of FIG. 7B, according to aspects of the present disclosure.

FIG. 7C is a graph 760 illustrating normalization of the estimated orientation graph 720 of FIG. 7B, according to aspects of the present disclosure. In this next step of the vehicle specific odometry noise model fitting process, normalizing of the estimated orientation graph 720 of FIG. 7B is performed according to a square root of a distance traveled to provide a noise value via sample covariance. Normalizing the estimated orientation graph 720 of FIG. 7B according to a square root of a distance traveled provides an estimated standard deviation signal 770 of a vehicle yaw per a square root of the distance traveled. The graph 760 also illustrates an average 780 of the estimated standard deviation signal 770 of the vehicle yaw per the square root of the distance traveled. This example also illustrates a true orientation 790 based on the simulations.

Figure 8A:
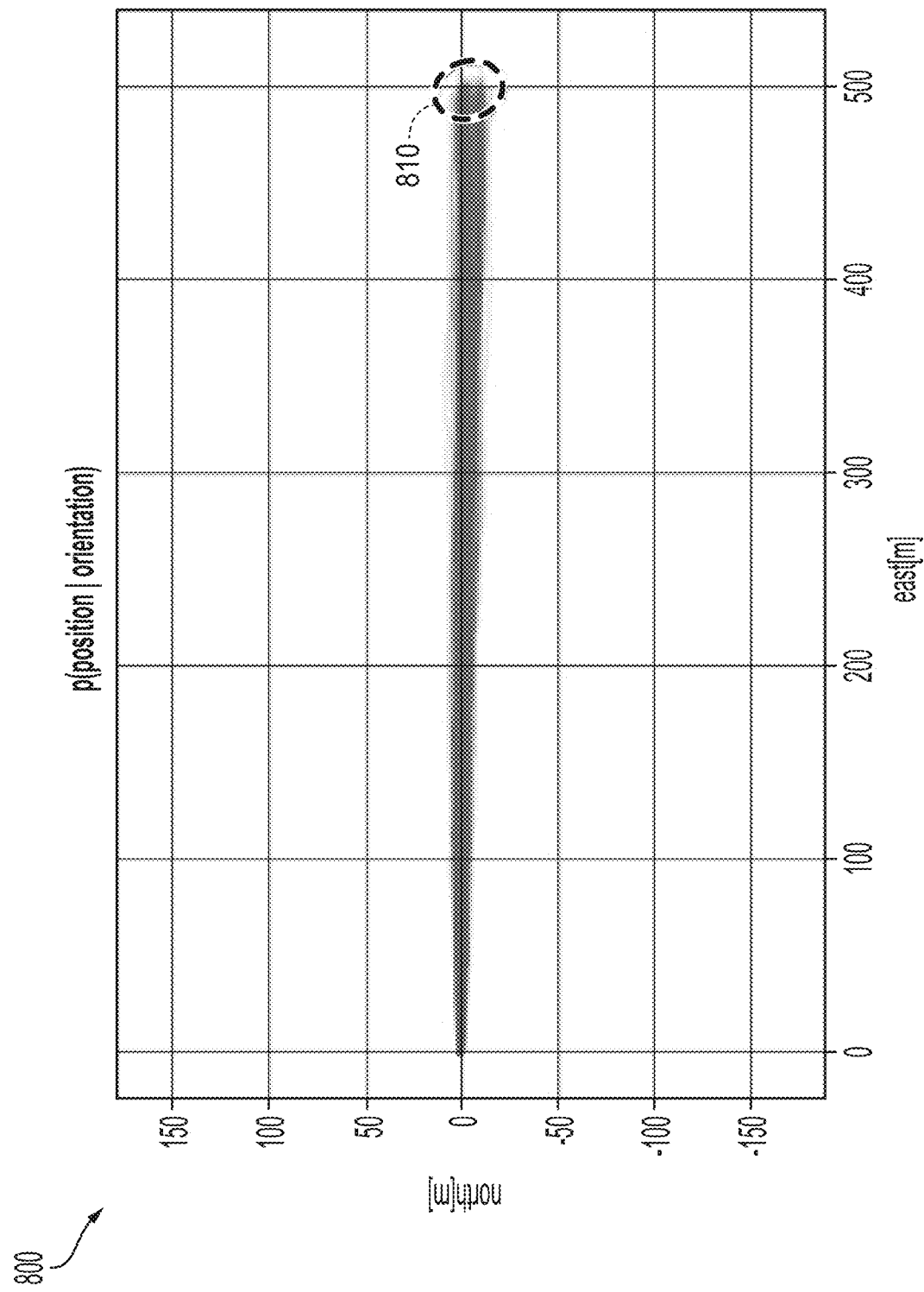
FIGS. 8A and 8B are graphs illustrating the final steps of the vehicle specific odometry noise model fitting process, according to aspects of the present disclosure.
Figure 8B:
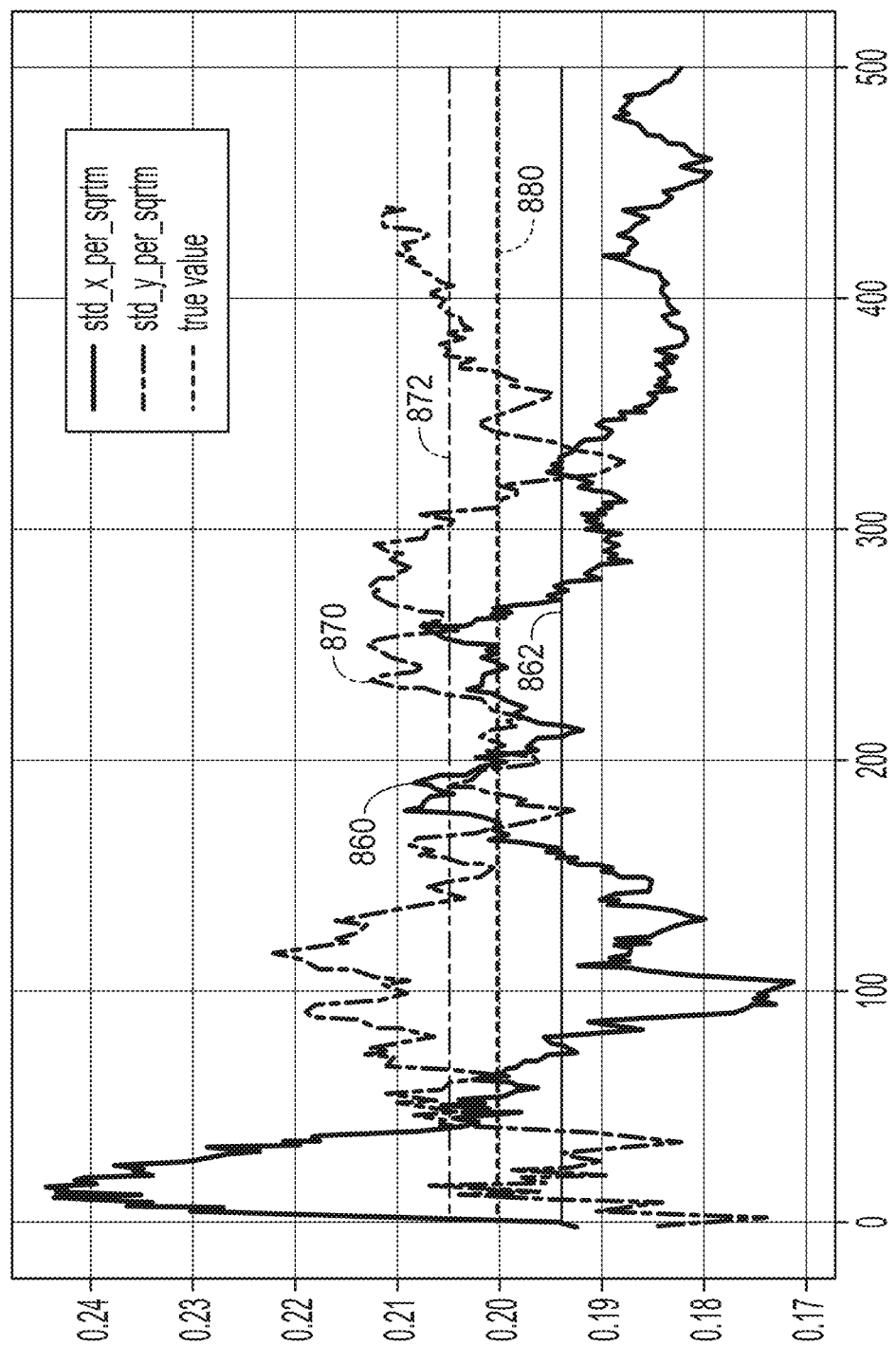

FIGS. 8A and 8B are graphs illustrating the final steps of the vehicle specific odometry noise model fitting process, according to aspects of the present disclosure. FIG. 8A illustrates a trajectory graph 800 of the vehicle specific odometry noise model fitting process continues by conditioning on average 780 of the estimated standard deviation signal 770 of the vehicle yaw per the square root of the distance traveled. In some aspects of the present disclosure, conditioning on the average 780 of the estimated standard deviation signal 770 of FIG. 7C is used to re-derive the trajectories 710 shown in the graph 700 of FIG. 7A to generate trajectories 810 for all the trajectory samples shown in FIG. 7A.

As shown in FIG. 8B, the final step of the vehicle specific odometry noise model fitting process uses the trajectories 810 re-derived for the trajectories 710 shown in FIG. 7A. Based on the trajectories 810, the vehicle specific odometry noise model fitting process plots an estimate of a standard deviation of the sensor noise in an X-direction (e.g., an estimated X-direction standard deviation signal 860) and a Y-direction (e.g., an estimated Y-direction standard deviation signal 870) over distance, as shown in a standard deviation graph 850 of FIG. 8B. The standard deviation graph 850 also illustrates an X-direction average 862 of the estimated X-direction standard deviation signal 860, and a Y-direction average 872 of the estimated Y-direction standard deviation signal 870. A true value 880 of the positional parameter (e.g., std_xyz_per_sqrtm) is also shown In some aspects of the present disclosure, the vehicle specific odometry noise model fitting process fits the odometry noise model of a vehicle based on the estimated X-direction standard deviation signal 860 and the estimated Y-direction standard deviation signal 870 of the motion sensor noise of the vehicle, by compensating according to the X-direction average 862 and the Y-direction average 872.

Figure 9A:
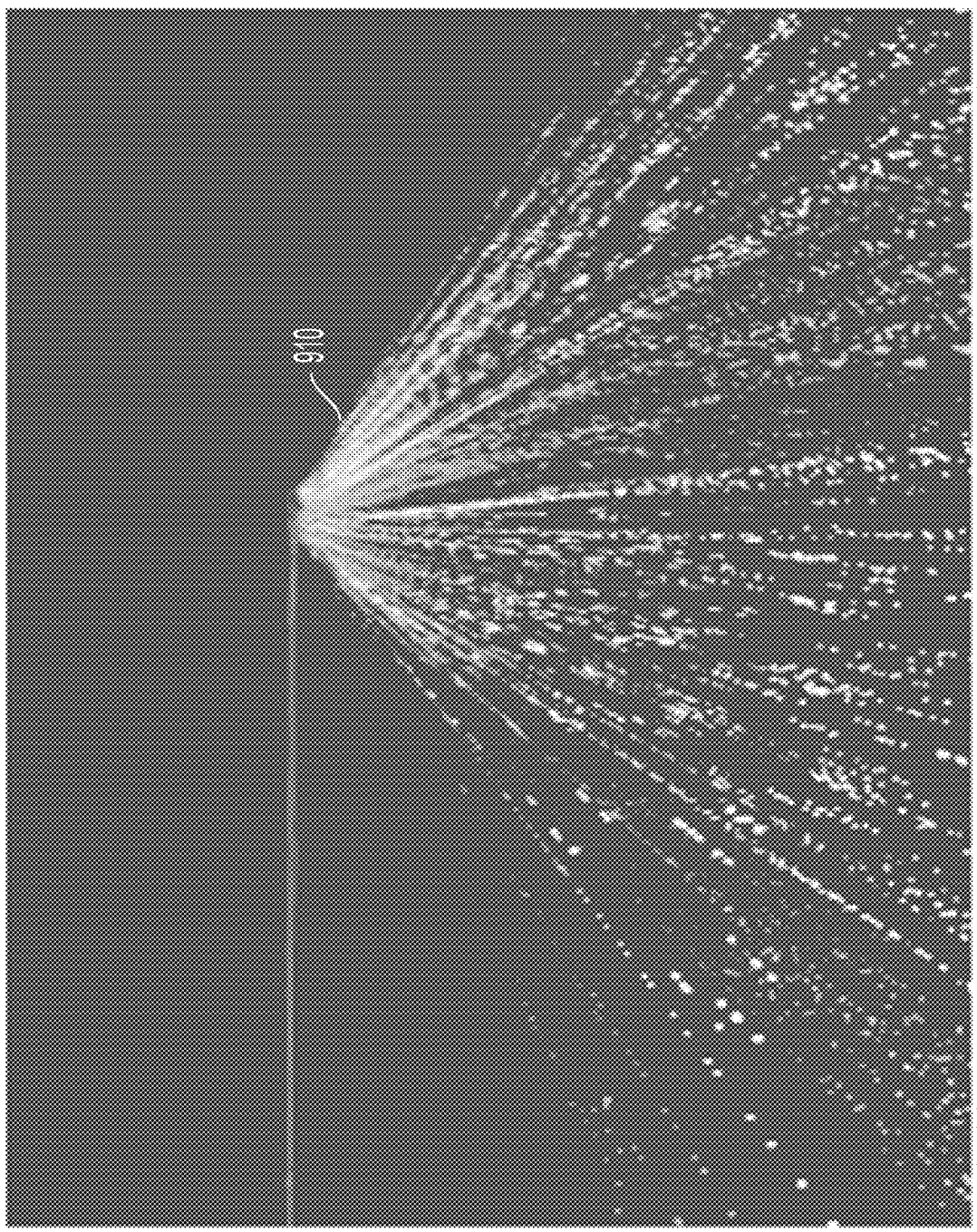
FIG. 9A illustrates an electronic map generated without noise compensated motion sensors of a fleet of vehicles, according to aspects of the present disclosure.
Figure 9B:
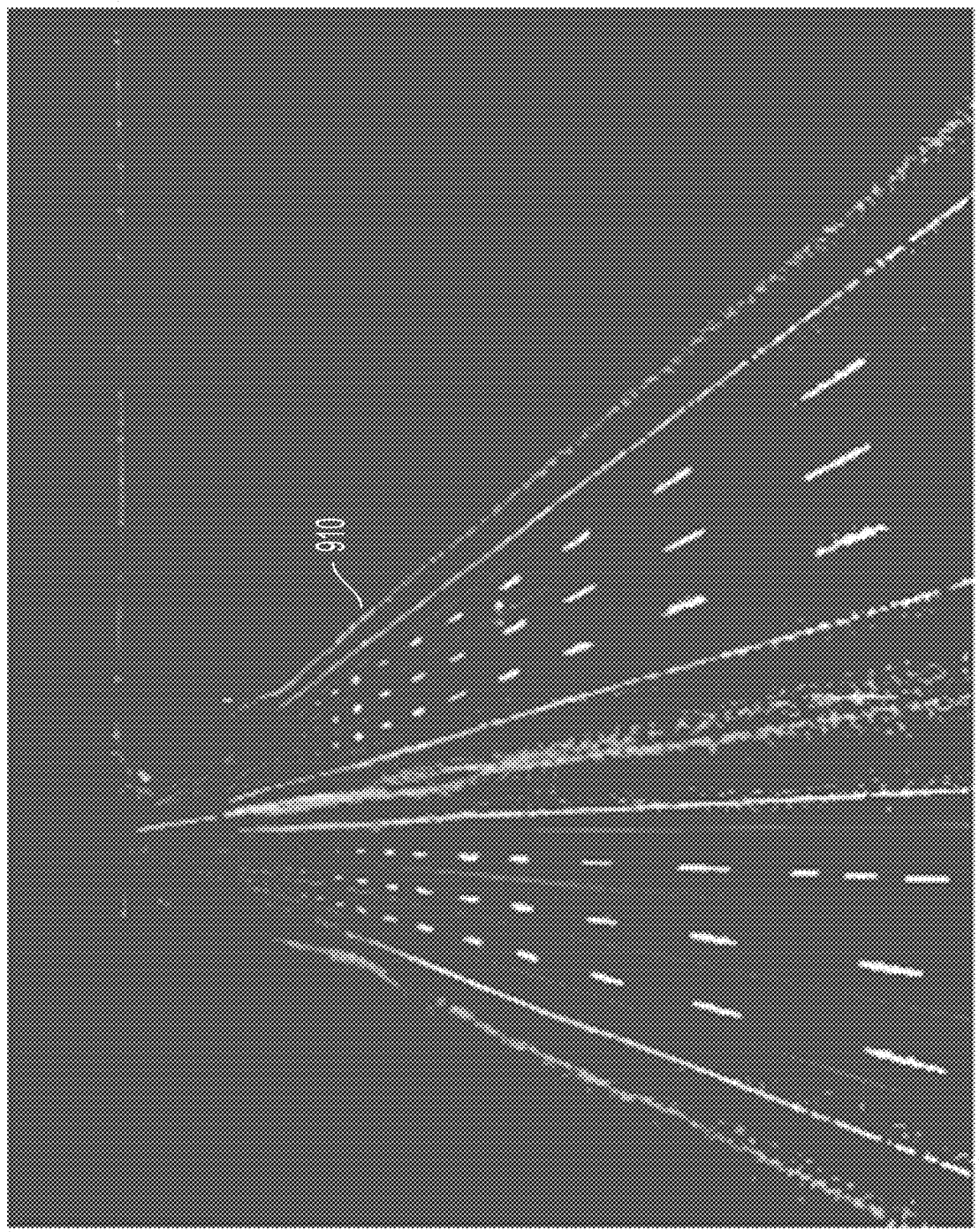
FIG. 9B illustrate electronic map generated from noise compensated motion sensors of a fleet of vehicles, according to aspects of the present disclosure.

FIG. 9A illustrates an electronic map generated without noise compensated motion sensors of a fleet of vehicles, according to aspects of the present disclosure. As shown in FIG. 9A, noise from the uncompensated motion sensors of the fleet of vehicles results in a corrupted electronic map 900. FIG. 9B illustrates an high-definition (HD) electronic map generated from noise compensated motion sensors of a fleet of vehicles, according to aspects of the present disclosure. As shown in FIG. 9B, the electronic map 950 includes a highway 960 as part of the electronic map 950. The electronic map 950 may be expanded using various simultaneous localization and mapping (SLAM) graphs based on noise compensated motion sensor data from a fleet of vehicles. This process may be performed according to a vehicle specific odometry noise model learning process, for example, as shown in FIG. 10.

Figure 10:
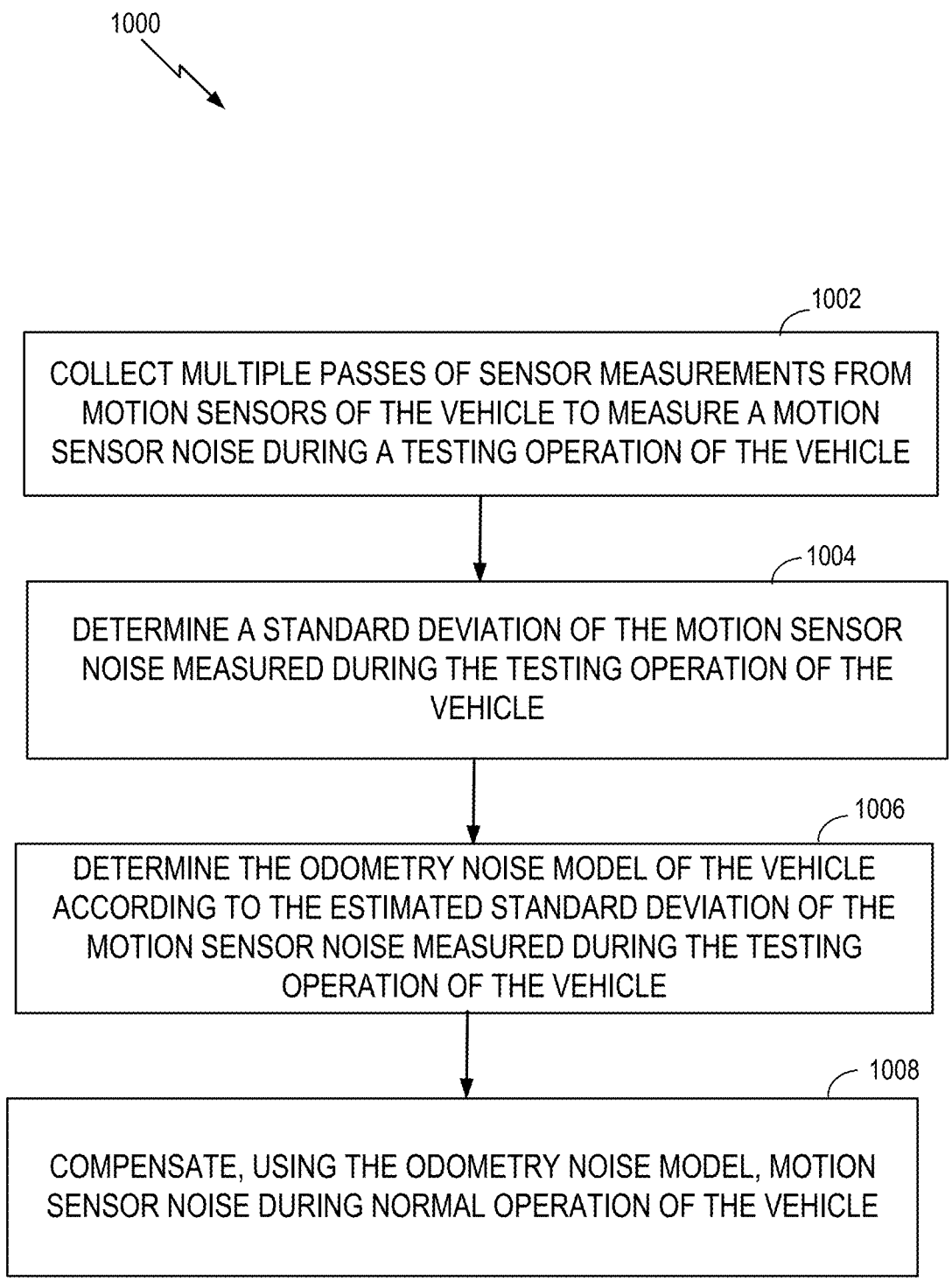
FIG. 10 is a flowchart illustrating a method for fitting an odometry noise model of a vehicle, according to aspects of the present disclosure.

FIG. 10 is a flowchart illustrating a method for fitting an odometry noise model of a vehicle, according to aspects of the present disclosure. The method 1000 begins at block 1002, in which multiple passes of sensor measurements are collected from motion sensors of the vehicle to measure a motion sensor noise during a testing operation of the vehicle. For example, FIG. 4B illustrates the first step of a vehicle specific odometry noise model learning process, in which multiple passes of sensor measurements are collected from the motion sensors of a vehicle while driving the vehicle down a straight road 400 several times. Preferably, the sensor measurements are performed while driving down the straight road 400. Alternatively, it is possible to perform multiple passes on different roads that are all substantially straight using a fleet of vehicles.

At block 1004, a standard deviation of the motion sensor noise measured during the testing operation of the vehicle is determined. For example, as shown in FIG. 6B, the vehicle specific odometry noise model learning process uses the trajectories 610 re-derived for all the trajectories 460 shown in the trajectory graph 450 FIG. 4C. Based on the trajectories 610, the vehicle specific odometry noise model learning process plots an estimate of a standard deviation of the motion sensor noise in an X direction (e.g., an estimated X-direction standard deviation signal 660) and a Y-direction (e.g., an estimated Y-direction standard deviation signal 670) over distance, as shown in a standard deviation graph 650 of FIG. 6B.

At block 1006, the odometry noise model of the vehicle is determined according to the estimated standard deviation of the motion sensor noise measured during the testing operation of the vehicle. For example, as shown in FIG. 6B, the standard deviation graph 650 also illustrates the X-direction average 662 of the estimated X-direction standard deviation signal 660 and the Y-direction average 672 of the estimated Y-direction standard deviation signal 670. In some aspects of the present disclosure, the vehicle specific odometry noise model learning process learns the odometry noise model of a vehicle based on the estimated X-direction standard deviation signal 660 and the estimated Y-direction standard deviation signal 670 of the motion sensor noise of the vehicle, relative to the X-direction average 662 and the Y-direction average 672.

At block 1008, motion sensor noise during normal operation of the vehicle is compensated using the odometry noise model. For example, as shown in FIG. 3, the learned odometry noise model 316 is configured to determine an odometry noise model of the vehicle, according to the determined standard deviation of the motion sensor noise measured during the testing operation of the car 350. Once the odometry model is determined, the odometry noise compensation module 318 is configured to compensate motion sensor noise during normal operation of the car 350 using the learned odometry noise model 316, as further illustrated in FIGS. 4-9.

The method 1000 may further include measuring the motion sensor noise during the testing operation of a fleet of vehicles. The method 1000 may determine the estimated standard deviation of the motion sensor noise by visualizing odometry signals based on the multiple passes of sensor measurements, in which a trajectory of the vehicle begins at a same location. The method 1000 may also include computing an initial mean orientation of the visualizing of the odometry signals as a function of a distance traveled by the vehicle. The method 1000 may also include normalizing the initial mean orientation of the visualizing of the odometry signals by a square root of the distance traveled to attain the estimated standard deviation of the motion sensor noise.

The method 1000 may also include re-visualizing the odometry signals based on the estimated standard deviation for the distance traveled. The method 1000 may also include computing a final mean orientation of the re-visualizing of the odometry signals as the function of the distance traveled by the vehicle. The method 1000 may further include normalizing the final mean orientation of the re-visualizing of the odometry signals by the square root of the distance traveled to attain the estimated standard deviation of the motion sensor noise. The method 1000 may also include learning the odometry noise model according to an estimated X-direction standard deviation signal and an estimated Y-direction standard deviation signal of the motion sensor noise of the vehicle, relative to an X-direction mean and a Y-direction mean. The method 1000 may also include generating a high-definition motion map based on a vehicle odometry signal of a fleet of vehicles compensated based on the odometry noise model, as shown in FIG. 9B.

The method 1000 may also include visualizing odometry signals based on simulated passes of sensor measurements, in which a trajectory of a simulation begins at a same location according to a positional parameter and an orientation parameter. The method 1000 may also include estimating an average orientation for each pose of the visualizing of the odometry signals as a function of a distance traveled by the vehicle. normalizing the average orientation by a square root of the distance traveled to attain the estimated standard deviation of the motion sensor noise. The method 1000 may also include re-visualizing the odometry signals based on the average orientation as the function of the distance traveled. The method 1000 may also include plotting an estimated X-direction standard deviation signal and an estimated Y-direction standard deviation signal of the motion sensor noise of the vehicle over the distance traveled based the re-visualizing of the odometry signals, for example, as shown in FIGS. 7A-8B.

In some aspects of the present disclosure, the method 1000 may be performed by the system-on-a-chip (SOC) 100 (FIG. 1) or the software architecture 200 (FIG. 2) of the ego vehicle 150 (FIG. 1). That is, each of the elements of method 1000 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array (FPGA) signal or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a compact disc-read-only memory (CD-ROM), and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, digital signal processors (DSPs), and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more programmable gate arrays (PGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into random access memory (RAM) from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise random access memory (RAM), read-only memory (ROM), electrically erasable programmable read-only memory (EEPROM), compact disc-read-only memory (CD-ROM) or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., random access memory (RAM), read-only memory (ROM), a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for fitting an odometry noise model of a vehicle, comprising:
   collecting multiple passes of sensor measurements from motion sensors of the vehicle to measure a motion sensor noise during a testing operation of the vehicle;
   determining an estimated standard deviation of the motion sensor noise measured during the testing operation of the vehicle;
   determining the odometry noise model of the vehicle according to the estimated standard deviation of the motion sensor noise measured during the testing operation of the vehicle;
   compensating, using the odometry noise model, the motion sensor noise during normal operation of the vehicle; and
   generating a high-definition (HD) electronic map based on a vehicle odometry signal of a fleet of vehicles compensated based on a respective one of the odometry noise model.

2. The method of claim 1, in which determining the estimated standard deviation of the motion sensor noise comprises:
   visualizing odometry signals based on the multiple passes of sensor measurements, in which a trajectory of the vehicle begins at a same location;
   computing a mean orientation of the visualizing of the odometry signals as a function of a distance traveled by the vehicle;
   normalizing the mean orientation of the visualizing of the odometry signals by a square root of the distance traveled to attain the estimated standard deviation of the motion sensor noise;
   re-visualizing the odometry signals based on the mean orientation as the function of the distance traveled; and
   plotting an estimated X-direction standard deviation signal and an estimated Y-direction standard deviation signal of the motion sensor noise of the vehicle over the distance traveled based on the re-visualizing of the odometry signals.

3. The method of claim 2, further comprising learning the odometry noise model according to the estimated X-direction standard deviation signal and the estimated Y-direction standard deviation signal of the motion sensor noise of the vehicle, relative to an X-direction average and a Y-direction average.

4. The method of claim 1, in which determining the estimated standard deviation further comprises:
   visualizing odometry signals based on simulated passes of sensor measurements, in which a trajectory of a simulation begins at a same location according to a positional parameter and an orientation parameter;

estimating an average orientation for each pose of the visualizing of the odometry signals as a function of a distance traveled by the vehicle;
normalizing the average orientation by a square root of the distance traveled to attain the estimated standard deviation of the motion sensor noise;
re-visualizing the odometry signals based on the average orientation as the function of the distance traveled; and
plotting an estimated X-direction standard deviation signal and an estimated Y-direction standard deviation signal of the motion sensor noise of the vehicle over the distance traveled based on the re-visualizing of the odometry signals.

5. The method of claim 4, further comprising fitting the positional parameter and the orientation parameter of the odometry noise model according to the estimated X-direction standard deviation signal and the estimated Y-direction standard deviation signal of the motion sensor noise of the vehicle, relative to an X-direction average and a Y-direction average.

6. The method of claim 1, in which determining the odometry noise model comprises attaining the estimated standard deviation of the motion sensor noise measured during the testing operation of the vehicle for a distance traveled by normalizing a square root of the distance traveled.

7. The method of claim 1, in which determining the odometry noise model comprises attaining the estimated standard deviation of a yaw of the vehicle for a distance traveled by normalizing per a square root of the distance traveled.

8. A non-transitory computer-readable medium having program code recorded thereon for fitting an odometry noise model of a vehicle, the program code being executed by a processor and comprising:
program code to collect multiple passes of sensor measurements from motion sensors of the vehicle to measure a motion sensor noise during a testing operation of the vehicle;
program code to determine an estimated standard deviation of the motion sensor noise measured during the testing operation of the vehicle;
program code to determine the odometry noise model of the vehicle according to the estimated standard deviation of the motion sensor noise measured during the testing operation of the vehicle;
program code to compensate, using the odometry noise model, the motion sensor noise during normal operation of the vehicle; and
program code to generate a high-definition (HD) electronic map based on a vehicle odometry signal of a fleet of vehicles compensated based on a respective one of the odometry noise model.

9. The non-transitory computer-readable medium of claim 8, in which the program code to determine the estimated standard deviation of the motion sensor noise comprises:
program code to visualize odometry signals based on the multiple passes of sensor measurements, in which a trajectory of the vehicle begins at a same location;
program code to compute a mean orientation of the visualizing of the odometry signals as a function of a distance traveled by the vehicle;
program code to normalize the mean orientation of the visualizing of the odometry signals by a square root of the distance traveled to attain the estimated standard deviation of the motion sensor noise;
program code to re-visualize the odometry signals based on the mean orientation as the function of the distance traveled; and
program code to plot an estimated X-direction standard deviation signal and an estimated Y-direction standard deviation signal of the motion sensor noise of the vehicle over the distance traveled based on the program code to re-visualize the odometry signals.

10. The non-transitory computer-readable medium of claim 9, further comprising program code to learn the odometry noise model according to the estimated X-direction standard deviation signal and the estimated Y-direction standard deviation signal of the motion sensor noise of the vehicle, relative to an X-direction average and a Y-direction average.

11. The non-transitory computer-readable medium of claim 8, in which the program code to determine the estimated standard deviation further comprises:
program code to visualize odometry signals based on simulated passes of sensor measurements, in which a trajectory of a simulation begins at a same location according to a positional parameter and an orientation parameter;
program code to estimate an average orientation for each pose of the visualizing of the odometry signals as a function of a distance traveled by the vehicle;
program code to normalize the average orientation by a square root of the distance traveled to attain the estimated standard deviation of the motion sensor noise;
program code to re-visualize the odometry signals based on the average orientation as the function of the distance traveled; and
program code to plot an estimated X-direction standard deviation signal and an estimated Y-direction standard deviation signal of the motion sensor noise of the vehicle over the distance traveled based on the program code to re-visualize the odometry signals.

12. The non-transitory computer-readable medium of claim 11, further comprising program code to fit the positional parameter and the orientation parameter of the odometry noise model according to the estimated X-direction standard deviation signal and the estimated Y-direction standard deviation signal of the motion sensor noise of the vehicle, relative to an X-direction average and a Y-direction average.

13. The non-transitory computer-readable medium of claim 8, in which the program code to determine the odometry noise model comprises program code to attain the estimated standard deviation of the motion sensor noise measured during the testing operation of the vehicle for a distance traveled by normalizing a square root of the distance traveled.

14. The non-transitory computer-readable medium of claim 8, in which the program code to determine the odometry noise model comprises program code to attain the estimated standard deviation of a yaw of the vehicle for a distance traveled by normalizing per a square root of the distance traveled.

15. A system for fitting an odometry noise model of a vehicle, the system comprising:
a sensor noise measurement module to collect multiple passes of sensor measurements from motion sensors of the vehicle to measure a motion sensor noise during a testing operation of the vehicle;
a standard deviation module to determine an estimated standard deviation of the motion sensor noise measured during the testing operation of the vehicle;

a learned odometry noise model to determine the odometry noise model of the vehicle according to the estimated standard deviation of the motion sensor noise measured during the testing operation of the vehicle; and an odometry noise compensation module to compensate, using the odometry noise model, the motion sensor noise during normal operation of the vehicle, and to generate a high-definition (HD) electronic map based on a vehicle odometry signal of a fleet of vehicles compensated based on a respective one of the odometry noise model.

16. The system of claim 15, in which the learned odometry noise model is trained to learn the odometry noise model according to an estimated X-direction standard deviation signal and an estimated Y-direction standard deviation signal of the motion sensor noise of the vehicle, relative to an X-direction average and a Y-direction average.

17. The system of claim 15, in which the learned odometry noise model is trained to fit a positional parameter and an orientation parameter of the odometry noise model according to an estimated X-direction standard deviation signal and an estimated Y-direction standard deviation signal of the motion sensor noise of the vehicle, relative to an X-direction average and a Y-direction average.

* * * * *